United States Patent
Jia et al.

(10) Patent No.: US 12,068,842 B2
(45) Date of Patent: Aug. 20, 2024

(54) OPTICAL SWITCHING APPARATUS, REDIRECTION METHOD, RECONFIGURABLE OPTICAL ADD/DROP MULTIPLEXER, AND SYSTEM

(71) Applicant: Huawei Technologies Co., Ltd., Shenzhen (CN)

(72) Inventors: Wei Jia, Shenzhen (CN); Han Zhao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 64 days.

(21) Appl. No.: 17/994,605

(22) Filed: Nov. 28, 2022

(65) Prior Publication Data

US 2023/0100718 A1 Mar. 30, 2023

Related U.S. Application Data

(63) Continuation of application No. PCT/CN2021/081988, filed on Mar. 22, 2021.

(30) Foreign Application Priority Data

May 30, 2020 (CN) .......................... 202010480914.8

(51) Int. Cl.
*H04B 10/00* (2013.01)
*H04J 14/02* (2006.01)
*H04Q 11/00* (2006.01)
*H04J 14/00* (2006.01)

(52) U.S. Cl.
CPC ...... *H04J 14/0212* (2013.01); *H04J 14/0213* (2013.01); *H04Q 11/0005* (2013.01); *H04Q 2011/0024* (2013.01)

(58) Field of Classification Search
CPC .. H04J 14/0201; H04J 14/0202; H04J 14/021; H04J 14/0212; H04Q 2011/0007; H04Q 2011/0016; H04Q 2011/0022; H04Q 2011/0026
See application file for complete search history.

(56) References Cited

U.S. PATENT DOCUMENTS

2019/0372674 A1* 12/2019 Smith ................. H04J 14/0212
2020/0021383 A1* 1/2020 Robertson .......... H04Q 11/0005
2020/0264379 A1* 8/2020 Frisken .............. G02B 26/0833

OTHER PUBLICATIONS

Seno, K., "Wide-Passband C+L-band Wavelength Selective Switch by Alternating Wave-Band Arrangement on LCOS," Dec. 22, 2022, 3 pages.

* cited by examiner

*Primary Examiner* — Daniel G Dobson
(74) *Attorney, Agent, or Firm* — Conley Rose, P.C.

(57) ABSTRACT

An optical switching apparatus includes an input port, a dispersion component, a first filter, a redirection component, and output ports. The input port enables a first and a second beam to be incident onto the dispersion component, which decomposes the first and the second beams respectively into a plurality of first and second sub-beams, where the plurality of first sub-beams and second sub-beams belong to different bands. The first filter separates transmission directions of the plurality of first and second sub-beams into different transmission directions in a first direction (X) based on the different bands, enables the plurality of first and second sub-beams respectively to be incident onto a first area and a second area of the redirection component, where the first and second areas are separated in the first direction.

20 Claims, 20 Drawing Sheets

CONT.
FROM
FIG. 21A

The optical switching apparatus transmits redirected second sub-beams to a second reflector by using the redirection component — 2108

The optical switching apparatus transmits the first sub-beams to a fifth area of the first filter by using the first reflector, and transmits the second sub-beams to a sixth area of the first filter by using the second reflector — 2109

The optical switching apparatus transmits the plurality of redirected first sub-beams and second sub-beams to the grating by using the first filter — 2110

The optical switching apparatus combines the plurality of first sub-beams into a third beam by using the grating, and combines the plurality of second sub-beams into a fourth beam by using the grating — 2111

The optical switching apparatus outputs the third beam and the fourth beam by using an output port — 2112

FIG. 21B

```
┌─────────────────────────────────────────────────────────────────┐
│  An optical switching apparatus enables, by using an input port, a first beam  │─── 2201
│           and a second beam to be incident onto a third filter                 │
└─────────────────────────────────────────────────────────────────┘
                                    │
                                    ▼
┌─────────────────────────────────────────────────────────────────┐
│   The optical switching apparatus transmits the first beam and the second      │─── 2202
│              beam to a second filter by using the third filter                 │
└─────────────────────────────────────────────────────────────────┘
                                    │
                                    ▼
┌─────────────────────────────────────────────────────────────────┐
│  The optical switching apparatus respectively transmits the first beam and the │─── 2203
│    second beam to a first grating and a second grating at different locations by │
│                          using the second filter                               │
└─────────────────────────────────────────────────────────────────┘
                                    │
                                    ▼
┌─────────────────────────────────────────────────────────────────┐
│  The optical switching apparatus decomposes the first beam into a plurality of │─── 2204
│                    first sub-beams by using the first grating                  │
└─────────────────────────────────────────────────────────────────┘
                                    │
                                    ▼
┌─────────────────────────────────────────────────────────────────┐
│  The optical switching apparatus decomposes the second beam into a plurality   │─── 2205
│                 of second sub-beams by using the second grating                │
└─────────────────────────────────────────────────────────────────┘
                                    │
                                    ▼
┌─────────────────────────────────────────────────────────────────┐
│  The optical switching apparatus transmits the plurality of first sub-beams to │─── 2206
│                   the second filter by using the first grating                 │
└─────────────────────────────────────────────────────────────────┘
                                    │
                                    ▼
┌─────────────────────────────────────────────────────────────────┐
│ The optical switching apparatus transmits the plurality of second sub-beams    │─── 2207
│                to the second filter by using the second grating                │
└─────────────────────────────────────────────────────────────────┘
                                    │
                                    ▼
                                   TO
                                FIG. 22B

FIG. 22A
```

OPTICAL SWITCHING APPARATUS, REDIRECTION METHOD, RECONFIGURABLE OPTICAL ADD/DROP MULTIPLEXER, AND SYSTEM

CROSS-REFERENCE TO RELATED APPLICATIONS

This is a continuation of International Patent Application No. PCT/CN2021/081988 filed on Mar. 22, 2021, which claims priority to Chinese Patent Application No. 202010480914.8 filed on May 30, 2020. The disclosures of the aforementioned applications are hereby incorporated by reference in their entireties.

TECHNICAL FIELD

This application relates to the field of fiber optic communication, and in particular, to an optical switching apparatus, a redirection method, a reconfigurable optical add/drop multiplexer, and a system.

BACKGROUND

With rapid development of an optical network service and an increase of a switching capacity, a signal band range in which a reconfigurable optical add/drop multiplexer (ROADM) needs to perform processing also increases. A wavelength selective switch (WSS) is an important component of the ROADM.

In the paper "Wide-Passband C+L-band Wavelength Selective Switch by Alternating Wave-Band Arrangement on LCOS", Kazunori Seno et. al, 2018 European Conference on Optical Communication (ECOC), 23 Sep. 2018, a WSS includes an input port 101 that inputs a C band beam and an L band beam, and arrayed waveguide gratings AWGs) 102 and 103 are disposed in parallel in a dispersion direction X. By using the AWGs 102 and 103, in the dispersion direction X, the C band beam and the L band beam are incident onto a grating 105 at different angles after passing through a lens 104, and in the dispersion direction X, the C band beam and the L band beam are emergent from the grating 105 at a same angle, so that an area in which a plurality of flares generated when the C band beam is irradiated onto a switching engine 106 are located and an area in which a plurality of flares generated when the L band beam is irradiated onto the switching engine 106 are located at least partially overlap in the dispersion direction X and are separated in a port direction Y, thereby effectively improving a filtering bandwidth.

However, when the AWGs are disposed in the WSS, insertion losses of the AWGs for spatial optical coupling are added.

SUMMARY

This application provides an optical switching apparatus, a redirection method, a reconfigurable optical add/drop multiplexer, and a system, to improve a filtering bandwidth.

According to a first aspect, this application provides an optical switching apparatus, including input ports, a dispersion component, a first filter, a redirection component, and an output port. The input ports are configured to enable a first beam and a second beam to be incident onto the dispersion component, and the dispersion component is configured to decompose the first beam into a plurality of first sub-beams, the dispersion component is further configured to decompose the second beam into a plurality of second sub-beams, and the dispersion component is further configured to transmit the plurality of first sub-beams and the plurality of second sub-beams to the first filter, where the plurality of first sub-beams and the plurality of second sub-beams belong to different bands. The first filter is configured to separate transmission directions of the plurality of first sub-beams and the plurality of second sub-beams into different transmission directions in a first direction based on the different bands, enable the plurality of first sub-beams to be incident onto a first area of the redirection component, and enable the plurality of second sub-beams to be incident onto a second area of the redirection component, where the first area and the second area are separated from each other in the first direction, and the first direction is a port direction of the redirection component. The output port is configured to output a plurality of first sub-beams and a plurality of second sub-beams that are obtained after redirection is performed by using the redirection component.

It can be learned that separation between the first area and the second area in the first direction X is implemented by using the first filter, to effectively improve a filtering bandwidth of the optical switching apparatus, and effectively reduce a quantity of optical components included in the optical switching apparatus, thereby effectively reducing an insertion loss.

Based on the first aspect, in an optional implementation, a second filter is further included between the dispersion component and the input ports, and the dispersion component includes a first grating and a second grating. The input ports are configured to enable the first beam and the second beam to be incident onto the second filter. The second filter is configured to respectively change the transmission directions of the first beam and the second beam based on the bands to which the first beam and the second beam belong, and respectively transmit the first beam and the second beam to the first grating and the second grating at different locations. The first grating is configured to transmit the plurality of first sub-beams to the second filter, and the second grating is configured to transmit the plurality of second sub-beams to the second filter. The second filter is configured to transmit the plurality of first sub-beams and the plurality of second sub-beams to the redirection component based on the different bands, so that the first area and the second area at least partially overlap in a second direction, where the second direction is a wavelength direction of the redirection component, and the first direction is perpendicular to the second direction.

It can be learned that overlapping or partial overlapping between the first area and the second area in the second direction Y is implemented by using the second filter, to further improve the filtering bandwidth of the optical switching apparatus.

Based on the first aspect, in an optional implementation, the first grating is configured to transmit at least one first sub-beam to a third area of the second filter, and the second grating is configured to transmit at least one second sub-beam to a fourth area of the second filter, where the third area and the fourth area at least partially overlap in the second direction.

It can be learned that when the third area and the fourth area at least partially overlap in the second direction, it can be effectively ensured that first flares and second flares overlap in the second direction Y, to improve the filtering bandwidth of the optical switching apparatus. The first flares are flares generated by the first beam in the first area, and the second flares are flares generated by the second beam in the second area.

Based on the first aspect, in an optional implementation, the input ports include a first input port and a second input port, locations of the first input port and the second input port are different in a second direction, the first input port is configured to input the first beam, and the second input port is configured to input the second beam. The first input port is configured to enable, in the second direction, the first beam to be incident onto the dispersion component at a first incident angle, and the second input port is configured to enable, in the second direction, the second beam to be incident onto the dispersion component at a second incident angle, where a difference between an absolute value of the first incident angle and an absolute value of the second incident angle is not zero, a difference between the first incident angle and a first blaze angle is less than or equal to a first preset value, a difference between the second incident angle and a second blaze angle is less than or equal to a second preset value, the first blaze angle corresponds to the band to which the first beam belongs, and the second blaze angle corresponds to the band to which the second beam belongs.

It can be learned that, when the difference between the first incident angle and the first blaze angle is less than or equal to the first preset value, efficiency of diffracting the first beam from the dispersion component can be effectively improved, and when the difference between the second incident angle and the second blaze angle is less than or equal to the second preset value, efficiency of diffracting the second beam from the dispersion component can be effectively improved.

Based on the first aspect, in an optional implementation, the optical switching apparatus further includes a lens component located between the input ports and the dispersion component, and the lens component is configured to transmit the first beam and the second beam to the dispersion component, where in the second direction, a value of a distance between the first input port and an optical axis of the lens component is related to a value of the first incident angle, and a value of a distance between the second input port and the optical axis of the lens component is related to a value of the second incident angle.

It can be learned that, the value of the distance between the first input port and the optical axis of the lens component is adjusted to effectively ensure that the difference between the first incident angle and the first blaze angle is less than or equal to the first preset value, to ensure the diffraction efficiency of the first beam, and the value of the distance between the second input port and the optical axis of the lens component is adjusted to effectively ensure that the difference between the second incident angle and the second blaze angle is less than or equal to the second preset value, to ensure the diffraction efficiency of the second beam.

Based on the first aspect, in an optional implementation, the optical switching apparatus further includes a first reflector and a second reflector. The first filter is configured to transmit the plurality of first sub-beams to the first reflector, and the first filter is further configured to transmit the plurality of second sub-beams to the second reflector. The first reflector is configured to transmit the plurality of first sub-beams to the redirection component, and the second reflector is configured to transmit the plurality of second sub-beams to the redirection component.

It can be learned that, it can be effectively ensured, by using the first reflector, that the first beam is transmitted to the first area of the redirection component, and it can be effectively ensured, by using the second reflector, that the second beam is transmitted to the second area of the redirection component, thereby improving the filtering bandwidth of the optical switching apparatus.

Based on the first aspect, in an optional implementation, the redirection component is configured to transmit the plurality of redirected first sub-beams to the first reflector, and the redirection component is further configured to transmit the plurality of redirected second sub-beams to the second reflector. The first reflector is configured to transmit the first sub-beams to a fifth area of the first filter, and the second reflector is configured to transmit the second sub-beams to a sixth area of the first filter.

Based on the first aspect, in an optional implementation, the first filter is configured to transmit the plurality of redirected first sub-beams and second sub-beams to the dispersion component, the dispersion component is configured to combine the plurality of first sub-beams into a third beam, and the dispersion component is further configured to combine the plurality of second sub-beams into a fourth beam, and the output port is configured to output the third beam and the fourth beam.

It can be learned that when the fifth area and the sixth area completely or partially overlap, the third beam and the fourth beam are output from a same output port of the optical switching apparatus, or when the fifth area and the sixth area are areas that do not overlap each other, the third beam and the fourth beam are output from different output ports of the optical switching apparatus.

Based on the first aspect, in an optional implementation, the first filter is configured to reflect the plurality of first sub-beams from the first filter as reflected light based on the band to which the plurality of first sub-beams belong, and the first filter is configured to enable the plurality of second sub-beams to pass through the first filter as pass-through light based on the band to which the plurality of second sub-beams belong.

It can be learned that the first filter uses a same transmission manner when a beam belonging to a same band passes through the thin film filter at two consecutive times. For example, the first sub-beam is reflected as reflected light at both two consecutive times. For another example, the second sub-beam passes as pass-through light at both two consecutive times. Therefore, filtering damage is effectively reduced.

Based on the first aspect, in an optional implementation, the first filter is a thin film filter, and the thin film filter has two areas with different refractive indexes. A difference between insertion losses caused when the two areas separately reflect one of the plurality of first sub-beams is less than or equal to a third preset value, and a difference between insertion losses caused when one of the plurality of second sub-beams separately passes through the two areas is less than or equal to the third preset value.

It can be learned that when the thin film filter has two areas with different refractive indexes, it can be effectively ensured that a filter spectrum of the first filter does not shift.

Based on the first aspect, in an optional implementation, the first beam has at least one different wavelength value from the second beam.

Based on the first aspect, in an optional implementation, the first beam is a C band beam, and the second beam is an L band beam.

According to a second aspect, this application provides an optical switching apparatus, including input ports, a third filter, a dispersion component, a redirection component, and an output port. The input ports are configured to enable a first beam and a second beam to be incident onto the third filter, where the first beam and the second beam belong to different bands. The third filter is configured to separate transmission directions of the first beam and the second beam into different transmission directions in a first direction based on the different bands, and transmit the first beam and the second beam to the dispersion component, where the first direction is a port direction of the redirection component. The dispersion component is configured to decompose the first beam into a plurality of first sub-beams, the dispersion component is further configured to decompose the second beam into a plurality of second sub-beams, and the dispersion component is further configured to enable the plurality of first sub-beams and the plurality of second sub-beams to be incident onto the redirection component, the plurality of first sub-beams are incident onto a first area of the redirection component, the plurality of second sub-beams are incident onto a second area of the redirection component, and the first area and the second area are separated from each other in the first direction. The output port is configured to output a plurality of first sub-beams and a plurality of second sub-beams that are obtained after redirection is performed by using the redirection component.

It can be learned that separation between the first area and the second area in the first direction X is implemented by using the third filter, to effectively improve a filtering bandwidth of the optical switching apparatus, and effectively reduce a quantity of optical components included in the optical switching apparatus, thereby effectively reducing an insertion loss.

Based on the second aspect, in an optional implementation, a second filter is further included between the dispersion component and the third filter, and the dispersion component includes a first grating and a second grating. The third filter is configured to enable the first beam and the second beam to be incident onto the second filter. The second filter is configured to respectively change the transmission directions of the first beam and the second beam based on the different bands, and respectively transmit the first beam and the second beam to the first grating and the second grating at different locations. The first grating is configured to transmit the plurality of first sub-beams to the second filter, and the second grating is configured to transmit the plurality of second sub-beams to the second filter. The second filter is configured to respectively transmit the plurality of first sub-beams and the plurality of second sub-beams to the redirection component based on the bands to which the plurality of first sub-beams and the plurality of second sub-beams belong, so that the first area and the second area at least partially overlap in a second direction, where the second direction is a wavelength direction of the redirection component, and the first direction is perpendicular to the second direction.

It can be learned that overlapping or partial overlapping between the first area and the second area in the second direction Y is implemented by using the second filter, to further improve the filtering bandwidth of the optical switching apparatus.

Based on the second aspect, in an optional implementation, the first grating is configured to transmit at least one first sub-beam to a third area of the second filter, and the second grating is configured to transmit at least one second sub-beam to a fourth area of the second filter, where the third area and the fourth area at least partially overlap in the second direction.

It can be learned that when the third area and the fourth area at least partially overlap in the second direction, it can be effectively ensured that first flares and second flares overlap in the second direction Y, to improve the filtering bandwidth of the optical switching apparatus. The first flares are flares generated by the first beam in the first area, and the second flares are flares generated by the second beam in the second area.

Based on the second aspect, in an optional implementation, the input ports include a first input port and a second input port, locations of the first input port and the second input port are different in a second direction, the first input port is configured to input the first beam, and the second input port is configured to input the second beam. The third filter is configured to enable, in the second direction, the first beam to be incident onto the dispersion component at a first incident angle, and the third filter is further configured to enable, in the second direction, the second beam to be incident onto the dispersion component at a second incident angle, where a difference between an absolute value of the first incident angle and an absolute value of the second incident angle is not zero, a difference between the first incident angle and a first blaze angle is less than or equal to a fourth preset value, a difference between the second incident angle and a second blaze angle is less than or equal to a fifth preset value, the first blaze angle corresponds to the band to which the first beam belongs, and the second blaze angle corresponds to the band to which the second beam belongs.

It can be learned that, when the difference between the first incident angle and the first blaze angle is less than or equal to the fourth preset value, efficiency of diffracting the first beam from the dispersion component can be effectively improved, and when the difference between the second incident angle and the second blaze angle is less than or equal to the fifth preset value, efficiency of diffracting the second beam from the dispersion component can be effectively improved.

Based on the second aspect, in an optional implementation, the optical switching apparatus further includes a lens component located between the third filter and the dispersion component, and the lens component is configured to transmit the first beam and the second beam from the third filter to the dispersion component, where in the second direction, a value of a distance between the first input port and an optical axis of the lens component is related to a value of the first incident angle, and a value of a distance between the second input port and the optical axis of the lens component is related to a value of the second incident angle.

It can be learned that, the value of the distance between the first input port and the optical axis of the lens component is adjusted to effectively ensure that the difference between the first incident angle and the first blaze angle is less than or equal to the fourth preset value, to ensure the diffraction efficiency of the first beam, and the value of the distance between the second input port and the optical axis of the lens component is adjusted to effectively ensure that the difference between the second incident angle and the second blaze angle is less than or equal to the fifth preset value, to ensure the diffraction efficiency of the second beam.

Based on the second aspect, in an optional implementation, the third filter is configured to reflect the first beam from the third filter as reflected light based on the band to which the first beam belongs, and the third filter is configured to enable the second beam to pass through the third filter as pass-through light based on the band to which the second beam belongs.

Based on the second aspect, in an optional implementation, the third filter is a thin film filter, and the thin film filter has two areas with different refractive indexes. A difference between insertion losses caused when the two areas separately reflect the first beam is less than or equal to a third preset value, and a difference between insertion losses caused when the second beam separately passes through the two areas is less than or equal to the third preset value.

It can be learned that the third filter uses a same transmission manner when a beam belonging to a same band passes through the thin film filter at two consecutive times. For example, the first sub-beam is reflected as reflected light at both two consecutive times. For another example, the second sub-beam passes as pass-through light at both two consecutive times. Therefore, filtering damage is effectively reduced.

Based on the second aspect, in an optional implementation, the first beam has at least one different wavelength value from the second beam.

Based on the second aspect, in an optional implementation, the first beam is a C band beam, and the second beam is an L band beam.

According to a third aspect, this application provides a redirection method, applied to an optical switching apparatus. The optical switching apparatus includes input ports, a dispersion component, a first filter, a redirection component, and an output port, and the method includes enabling, by using the input ports, a first beam and a second beam to be incident onto the dispersion component, decomposing, by using the dispersion component, the first beam into a plurality of first sub-beams, decomposing the second beam into a plurality of second sub-beams, and transmitting the plurality of first sub-beams and the plurality of second sub-beams to the first filter, where the plurality of first sub-beams and the plurality of second sub-beams belong to different bands, separating, by using the first filter, transmission directions of the plurality of first sub-beams and the plurality of second sub-beams into different transmission directions in a first direction based on the different bands, enabling the plurality of first sub-beams to be incident onto a first area of the redirection component, and enabling the plurality of second sub-beams to be incident onto a second area of the redirection component, where the first area and the second area are separated from each other in the first direction, and the first direction is a port direction of the redirection component, and outputting, by using the output port, a plurality of first sub-beams and a plurality of second sub-beams that are obtained after redirection is performed by using the redirection component.

For descriptions of beneficial effects shown in this aspect, refer to those shown in the first aspect. Details are not described again.

Based on the third aspect, in an optional implementation, a second filter is further included between the dispersion component and the input ports, the dispersion component includes a first grating and a second grating, and enabling, by using the input ports, a first beam and a second beam to be incident onto the dispersion component includes enabling, by using the input ports, the first beam and the second beam to be incident onto the second filter, and respectively changing, by using the second filter, the transmission directions of the first beam and the second beam based on the bands to which the first beam and the second beam belong, and respectively transmitting the first beam and the second beam to the first grating and the second grating at different locations, and the method further includes transmitting, by using the first grating, the plurality of first sub-beams to the second filter, and transmitting, by using the second grating, the plurality of second sub-beams to the second filter, and transmitting, by using the second filter, the plurality of first sub-beams and the plurality of second sub-beams to the redirection component based on the different bands, so that the first area and the second area at least partially overlap in a second direction, where the second direction is a wavelength direction of the redirection component, and the first direction is perpendicular to the second direction.

Based on the third aspect, in an optional implementation, transmitting, by using the first grating, the plurality of first sub-beams to the second filter, and transmitting, by using the second grating, the plurality of second sub-beams to the second filter includes transmitting, by using the first grating, at least one first sub-beam to a third area of the second filter, and transmitting, by using the second grating, at least one second sub-beam to a fourth area of the second filter, where the third area and the fourth area at least partially overlap in the second direction.

Based on the third aspect, in an optional implementation, the input ports include a first input port and a second input port, locations of the first input port and the second input port are different in the second direction, and enabling, by using the input ports, a first beam and a second beam to be incident onto the dispersion component includes enabling, in the second direction by using the first input port, the first beam to be incident onto the dispersion component at a first incident angle, and enabling, in the second direction by using the second input port, the second beam to be incident onto the dispersion component at a second incident angle, where a difference between an absolute value of the first incident angle and an absolute value of the second incident angle is not zero, a difference between the first incident angle and a first blaze angle is less than or equal to a first preset value, a difference between the second incident angle and a second blaze angle is less than or equal to a second preset value, the first blaze angle corresponds to the band to which the first beam belongs, and the second blaze angle corresponds to the band to which the second beam belongs.

Based on the third aspect, in an optional implementation, the optical switching apparatus further includes a lens component located between the input ports and the dispersion component, and the method further includes transmitting, by using the lens component, the first beam and the second beam to the dispersion component, where in the second direction, a value of a distance between the first input port and an optical axis of the lens component is related to a value of the first incident angle, and a value of a distance between the second input port and the optical axis of the lens component is related to a value of the second incident angle.

Based on the third aspect, in an optional implementation, the optical switching apparatus further includes a first reflector and a second reflector, and enabling, by using the first filter, the plurality of first sub-beams to be incident onto a first area of the redirection component, and enabling the plurality of second sub-beams to be incident onto a second area of the redirection component includes transmitting, by using the first filter, the plurality of first sub-beams to the first reflector, and transmitting, by using the first filter, the plurality of second sub-beams to the second reflector, and transmitting, by using the first reflector, the plurality of first sub-beams to the redirection component, and transmitting, by using the second reflector, the plurality of second sub-beams to the redirection component.

Based on the third aspect, in an optional implementation, the method further includes transmitting, by using the redirection component, the plurality of redirected first sub-beams to the first reflector, and transmitting, by using the redirection component, the plurality of redirected second sub-beams to the second reflector, and transmitting, by using the first reflector, the first sub-beams to a fifth area of the first filter, and transmitting, by using the second reflector, the second sub-beams to a sixth area of the first filter.

Based on the third aspect, in an optional implementation, the method further includes transmitting, by using the first filter, the plurality of redirected first sub-beams and second sub-beams to the dispersion component, combining, by using the dispersion component, the plurality of first sub-beams into a third beam, and combining, by using the dispersion component, the plurality of second sub-beams into a fourth beam, and outputting, by using the output port, the third beam and the fourth beam.

Based on the third aspect, in an optional implementation, separating, by using the first filter, transmission directions of the plurality of first sub-beams and the plurality of second sub-beams into different transmission directions in a first direction based on the different bands includes reflecting, by using the first filter, the plurality of first sub-beams from the first filter as reflected light based on the band to which the plurality of first sub-beams belong, and enabling, by using the first filter, the plurality of second sub-beams to pass through the first filter as pass-through light based on the band to which the plurality of second sub-beams belong.

Based on the third aspect, in an optional implementation, the first filter is a thin film filter, and the thin film filter has two areas with different refractive indexes. A difference between insertion losses caused when the two areas separately reflect one of the plurality of first sub-beams is less than or equal to a third preset value, and a difference between insertion losses caused when one of the plurality of second sub-beams separately passes through the two areas is less than or equal to the third preset value.

According to a fourth aspect, this application provides a redirection method, applied to an optical switching apparatus. The optical switching apparatus includes input ports, a third filter, a dispersion component, a redirection component, and an output port. The method includes enabling, by using the input ports, a first beam and a second beam to be incident onto the third filter, where the first beam and the second beam belong to different bands, separating, by using the third filter, transmission directions of the first beam and the second beam into different transmission directions in a first direction based on the different bands, and transmitting, by using the third filter, the first beam and the second beam to the dispersion component, where the first direction is a port direction of the redirection component, decomposing, by using the dispersion component, the first beam into a plurality of first sub-beams, decomposing, by using the dispersion component, the second beam into a plurality of second sub-beams, and enabling, by using the dispersion component, the plurality of first sub-beams and the plurality of second sub-beams to be incident onto the redirection component, where the plurality of first sub-beams are incident onto a first area of the redirection component, the plurality of second sub-beams are incident onto a second area of the redirection component, and the first area and the second area are separated from each other in the first direction, and outputting, by using the output port, a plurality of first sub-beams and a plurality of second sub-beams that are obtained after redirection is performed by using the redirection component.

For descriptions of beneficial effects shown in this aspect, refer to those shown in the second aspect. Details are not described again.

Based on the fourth aspect, in an optional manner, a second filter is further included between the dispersion component and the third filter, the dispersion component includes a first grating and a second grating, and transmitting, by using the third filter, the first beam and the second beam to the dispersion component includes enabling, by using the third filter, the first beam and the second beam to be incident onto the second filter, and respectively changing, by using the second filter, the transmission directions of the first beam and the second beam based on the different bands, and respectively transmitting the first beam and the second beam to the first grating and the second grating at different locations, and the method further includes transmitting, by using the first grating, the plurality of first sub-beams to the second filter, and transmitting, by using the second grating, the plurality of second sub-beams to the second filter, and respectively transmitting, by using the second filter, the plurality of first sub-beams and the plurality of second sub-beams to the redirection component based on the bands to which the plurality of first sub-beams and the plurality of second sub-beams belong, so that the first area and the second area at least partially overlap in a second direction, where the second direction is a wavelength direction of the redirection component, and the first direction is perpendicular to the second direction.

Based on the fourth aspect, in an optional manner, the method further includes transmitting, by using the first grating, at least one first sub-beam to a third area of the second filter, and transmitting, by using the second grating, at least one second sub-beam to a fourth area of the second filter, where the third area and the fourth area at least partially overlap in the second direction.

Based on the fourth aspect, in an optional manner, the input ports include a first input port and a second input port, locations of the first input port and the second input port are different in the second direction, and transmitting, by using the third filter, the first beam and the second beam to the dispersion component includes enabling, in the second direction by using the third filter, the first beam to be incident onto the dispersion component at a first incident angle, and enabling, in the second direction by using the third filter, the second beam to be incident onto the dispersion component at a second incident angle, where a difference between an absolute value of the first incident angle and an absolute value of the second incident angle is not zero, a difference between the first incident angle and a first blaze angle is less than or equal to a fourth preset value, a difference between the second incident angle and a second blaze angle is less than or equal to a fifth preset value, the first blaze angle corresponds to the band to which the first beam belongs, and the second blaze angle corresponds to the band to which the second beam belongs.

Based on the fourth aspect, in an optional manner, the optical switching apparatus further includes a lens component located between the third filter and the dispersion component, and the method further includes transmitting, by using the lens component, the first beam and the second beam from the third filter to the dispersion component, where in the second direction, a value of a distance between the first input port and an optical axis of the lens component is related to a value of the first incident angle, and a value of a distance between the second input port and the optical axis of the lens component is related to a value of the second incident angle.

Based on the fourth aspect, in an optional manner, the method further comprises reflecting, by using the third filter, the first beam from the third filter as reflected light based on the band to which the first beam belongs, and enabling, by using the third filter, the second beam to pass through the third filter as pass-through light based on the band to which the second beam belongs.

Based on the fourth aspect, in an optional manner, the third filter is a thin film filter, and the thin film filter has two areas with different refractive indexes. A difference between insertion losses caused when the two areas separately reflect the first beam is less than or equal to a third preset value, and a difference between insertion losses caused when the second beam separately passes through the two areas is less than or equal to the third preset value.

According to a fifth aspect, this application provides a reconfigurable optical add/drop multiplexer, including a plurality of optical switching apparatuses, where different optical switching apparatuses are connected to each other by using an optical fiber, and the optical switching apparatus is shown in any one of the first aspect or the second aspect.

According to a sixth aspect, this application provides an optical communication system, including a plurality of reconfigurable optical add/drop multiplexers, where the reconfigurable optical add/drop multiplexer is shown in the fifth aspect.

BRIEF DESCRIPTION OF DRAWINGS

FIG. 21A and FIG. 21B are a flowchart of steps in a second embodiment of a redirection method according to this application;

FIG. 22A and FIG. 22B are a flowchart of steps in a third embodiment of a redirection method according to this application;

DESCRIPTION OF EMBODIMENTS

The following clearly describes the technical solutions in embodiments of the present disclosure with reference to the accompanying drawings in embodiments of the present disclosure. It is clear that the described embodiments are merely a part rather than all of embodiments of the present disclosure. All other embodiments obtained by persons of ordinary skill in the art based on embodiments of the present disclosure without creative efforts shall fall within the protection scope of the present disclosure.

In the specification, claims, and accompanying drawings of this application, the terms "first", "second", and so on are intended to distinguish between similar objects but do not necessarily indicate a specific order or sequence. Example embodiments of the present disclosure are more comprehensively described in the following with reference to the accompanying drawings, and the example embodiments are shown in the accompanying drawings. However, the present disclosure may be implemented in many different manners and should not be construed as being limited to embodiments described in this specification. On the contrary, these embodiments are provided, so that this disclosure is thorough and complete and the scope of the present disclosure is fully conveyed to persons skilled in the art. In the accompanying drawings, sizes and relative sizes of a layer and an area may be exaggerated for clarity purposes. Same reference signs always represent a same element.

Figure 1:
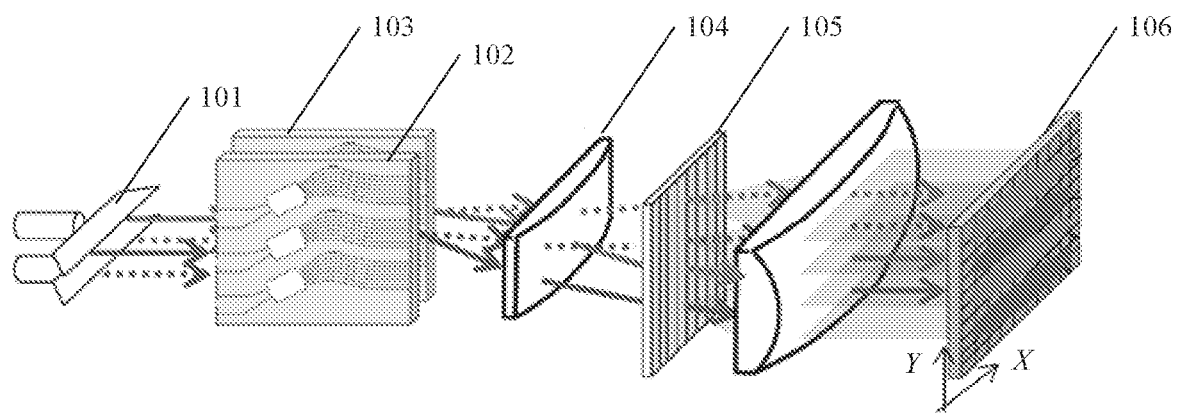
FIG. 1 is an example diagram of a structure of a wavelength selective switch according to the conventional technology.
Figure 2:
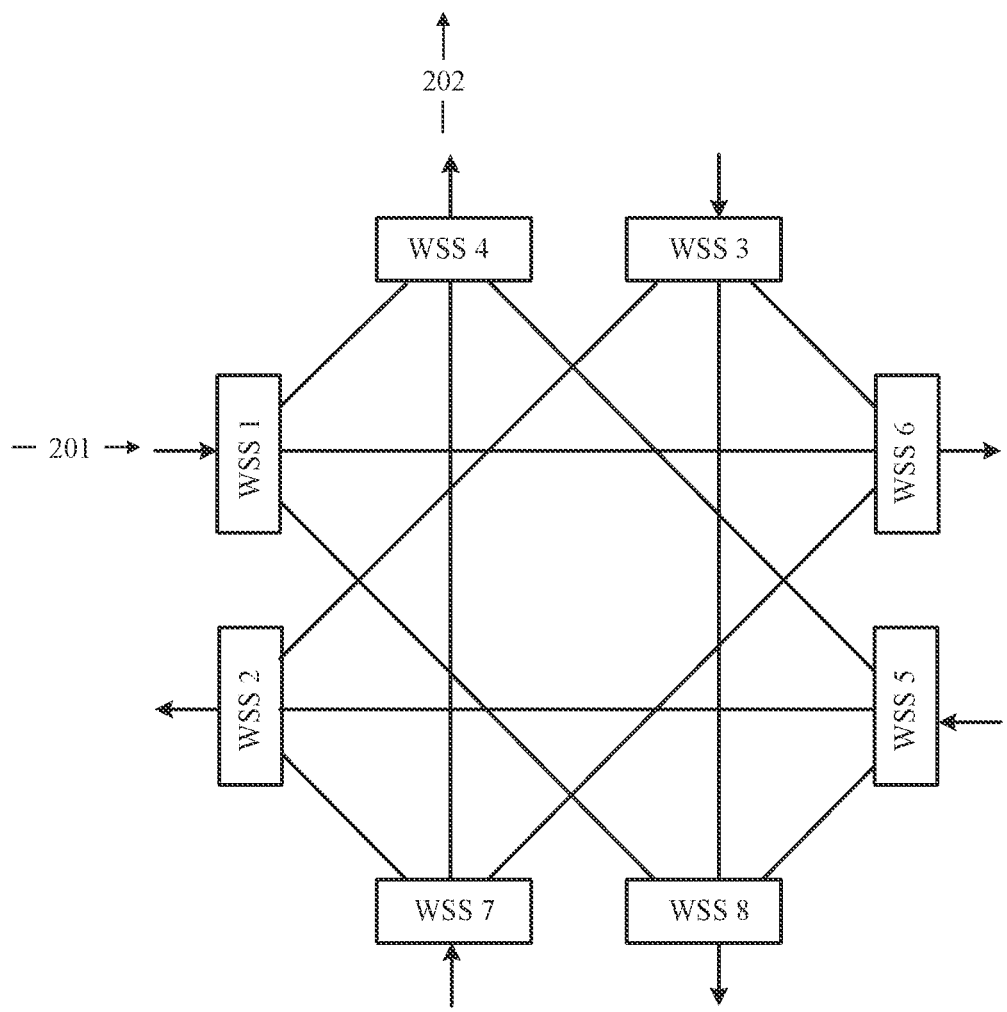
FIG. 2 is an example diagram of a structure of a reconfigurable optical add/drop multiplexer according to this application.

First, a structure of a ROADM provided in this application is described with reference to FIG. 2. FIG. 2 is an example diagram of a structure of a ROADM according to this application.

A specific network structure of the ROADM is not limited in this embodiment. For example, a ROADM including a plurality of optical switching apparatuses may use a network structure of a chain network, a ring network, a mesh network, or the like. As shown in FIG. 2, an example description is provided by using an example in which the ROADM uses a network structure of a mesh network. In this embodiment, an example description is provided by using an example in which an optical switching apparatus is a WSS.

In this embodiment, for example, the ROADM includes eight WSSs (a WSS 1 and a WSS 2 to a WSS 8). The eight WSSs are located at different locations. A quantity of WSSs included in the ROADM and locations of the WSSs are not limited in this embodiment. An optical signal is exchanged between WSSs at different locations, to implement flexible scheduling of the optical signal. Different locations shown in this embodiment may indicate different directions of N dimensions, where N is a positive integer greater than or equal to 1.

The WSS 1 is used as an example. The WSS 1 can transmit an optical signal to any WSS that is included in the ROADM and that is connected to the WSS 1 by using an optical fiber, to implement deflection of the optical signal in directions of different dimensions. For example, in the ROADM shown in this embodiment, the WSS 4, the WSS 6, and the WSS 8 are connected to the WSS 1 by using optical fibers, and therefore the WSS 1 can transmit an optical signal to any one of the WSS 4, the WSS 6, and the WSS 8. In this embodiment, an example description is provided by using an example in which the WSS 1 is connected to the WSS 4, the WSS 6, and the WSS 8 by using the optical fibers, and no limitation is imposed. In another example, the WSS 1 may be alternatively connected, by using an optical fiber, to any one of the WSS 2, the WSS 3, the WSS 5, and the WSS 7 that are included in the ROADM.

The following continues to describe optical signal switching by using the WSS 1 and the WSS 4 as an example.

An optical signal transmitted in a first-dimension direction 201 is input to the WSS 1 by using an input port of the WSS 1, the optical signal is redirected by using the WSS 1, the optical signal is transmitted to the WSS 4 by using an output port of the WSS 1 and an optical fiber, and the optical signal output from an output port of the WSS 4 is transmitted in a second-dimension direction 202, to implement deflection of a transmission direction of the optical signal from the first-dimension direction 201 to the second-dimension direction 202.

With reference to different embodiments, the following describes a structure of an optical switching apparatus provided in this application.

Embodiment 1

Figure 3:
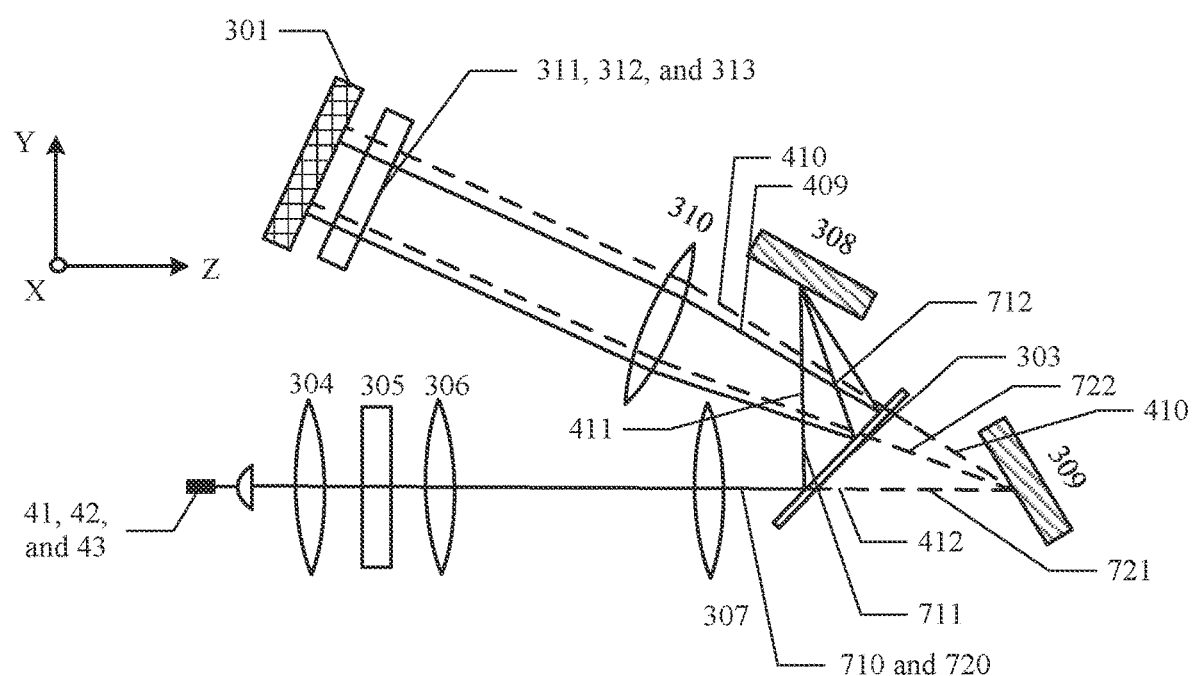
FIG. 3 is an example diagram of a first structure of an optical switching apparatus in a second direction according to this application.
Figure 4:
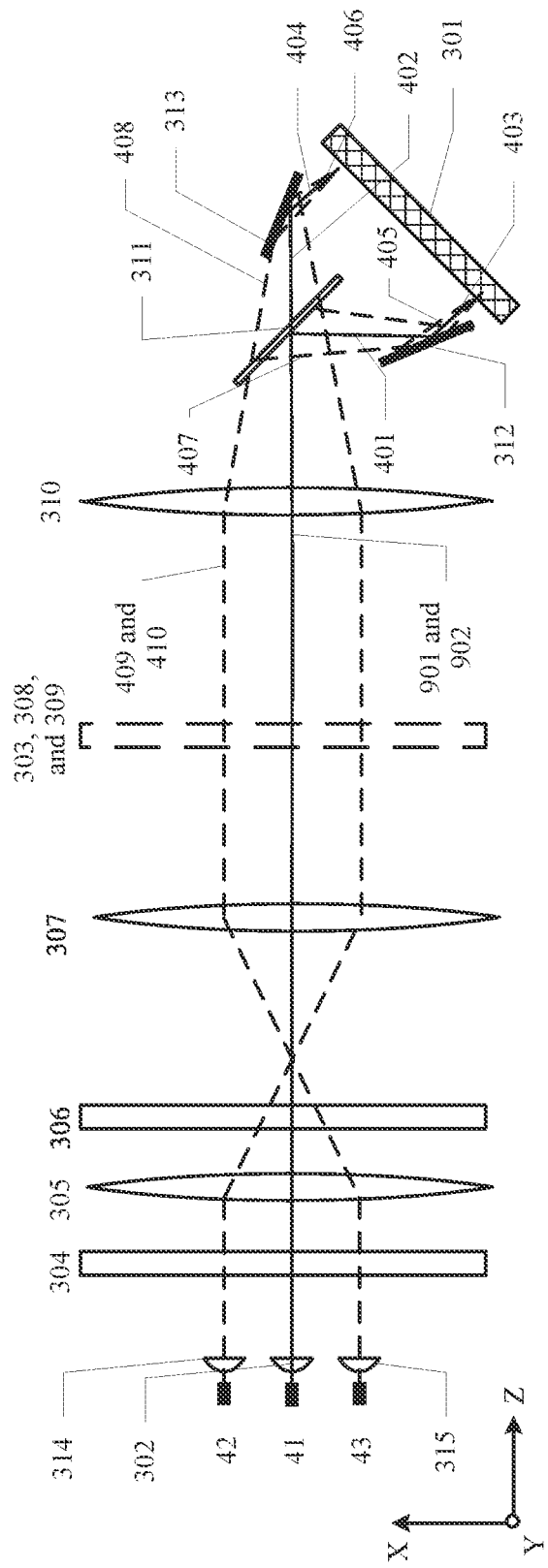
FIG. 4 is an example diagram of a first structure of an optical switching apparatus in a first direction according to this application.

The following describes, with reference to FIG. 3 and FIG. 4, a structure of an optical switching apparatus provided in this application. FIG. 3 is an example diagram of a structure of the optical switching apparatus in a second direction, and FIG. 4 is an example diagram of a structure of the optical switching apparatus in a first direction. The optical switching apparatus shown in this embodiment includes an input port 41, a dispersion component, a redirection component 301, and output ports (42 and 43). A specific quantity of input ports and a specific quantity of output ports are not limited in this embodiment.

The following first describes the first direction and the second direction that are shown in this application. The first direction shown in this embodiment may also be referred to as a switching direction or a port direction, and the second direction may also be referred to as a wavelength direction or a dispersion direction. Definitions of the first direction and the second direction are different with reference to different components included in the optical switching apparatus. Specific definitions are as follows.

Figure 5:
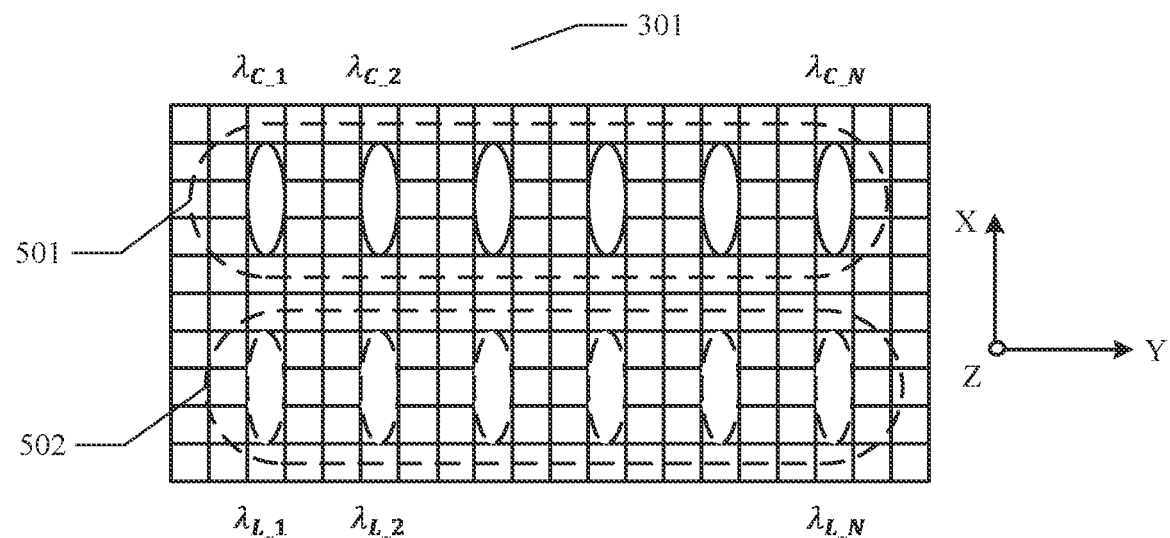
FIG. 5 is an example diagram of a first arrangement of flares on a redirection component according to this application.

First, it should be noted that, in this embodiment, a beam input to the optical switching apparatus by using the input port is transmitted in a third direction Z, the third direction Z is separately perpendicular to the first direction X and the second direction Y, and the first direction X is perpendicular to the second direction Y Definition 1:

This definition is performed with reference to the redirection component 301. The redirection component 301 shown in this embodiment is configured to deflect transmission directions of a first beam and a second beam that are input by using the input port. It should be noted that, in this embodiment, a quantity of beams on which the redirection component 301 performs transmission direction deflection and bands to which the beams belong are not limited, provided that different beams belong to different bands. To implement transmission direction deflection, as shown in FIG. 5, a plurality of flares generated by the first beam are located in a first area 501 of the redirection component 301, and a plurality of flares generated by the second beam are located in a second area 502 of the redirection component 301. The second direction Y is an arrangement direction of the plurality of flares included in the first area 501, and the second direction Y is also an arrangement direction of the plurality of flares included in the second area 502. The first direction X is an arrangement direction of the first area 501 and the second area 502 on the redirection component 301. It can be learned that, in a two-dimensional coordinate system XY formed by the first direction X and the second direction Y, flares generated by different beams may correspond to a same coordinate in the second direction Y, and the flares generated by the different beams correspond to different coordinates in the first direction X, so that the flares of the different beams overlap or at least partially overlap in the second direction Y, and the flares of the different beams are separated in the first direction X, to improve a filtering bandwidth of the redirection component 301.

Definition 2:

This definition is still performed with reference to the redirection component 301. Optionally, if the redirection component 301 is a liquid crystal on silicon (LCOS) chip, the first direction X is a direction in which a phase grating is loaded onto the redirection component 301 to generate a diffracted beam. Further, optionally, if the redirection component 301 is a liquid crystal array chip or micro-electromechanical systems (MEMS), the first direction X is a direction in which a deflected beam is generated. Further, the diffracted beam or the deflected beam is transmitted to an output port in an XZ plane, the XZ plane is a view plane formed by the first direction X and the third direction Z, that is, the XZ plane extends in both the first direction X and the third direction Z.

Definition 3:

This definition is performed with reference to the input port and the output ports that are included in the optical switching apparatus. It should be noted that, in this example, a description of locations of the input port and the output ports is an optional example, and no limitation is imposed, provided that the input port can input a beam to the optical switching apparatus and the output ports can output beams from the optical switching apparatus. As shown in FIG. 3 and FIG. 4, for example, the optical switching apparatus includes the input port 41, the output port 42, and the output port 43. The ports (41, 42, and 43) included in the optical switching apparatus are arranged in a same XZ plane. Further, locations of the plurality of ports (41, 42, and 43) are separated in the XZ plane, and locations of the plurality of ports (41, 42, and 43) may completely overlap or partially overlap in a YZ plane (a plane extending in both the second direction Y and the third direction Z).

The following describes objects (the first beam and the second beam) on which the optical switching apparatus performs transmission direction deflection in this embodiment.

In this embodiment, an example description is provided by using an example in which the optical switching apparatus is configured to deflect the transmission directions of the first beam and the second beam. In another example, the optical switching apparatus may alternatively deflect transmission directions of beams of another quantity, for example, deflect a transmission direction of one beam or deflect transmission directions of more than two beams. The first beam and the second beam that are shown in this embodiment have different wavelength ranges. With reference to an example, the following provides an example description of the fact that the first beam and the second beam have different wavelength ranges.

For example, in this embodiment, the first beam is a C band beam, and the second beam is an L band beam. For example, the first beam may be alternatively an E band beam, and the second beam may be alternatively an O band beam, provided that the first beam and the second beam are in different bands.

Further, for example, the first beam has N wavelength values: $\lambda_{c-1}, \lambda_{c-2}, \ldots,$ and $\lambda_{c-N}$, and the second beam may also have N wavelength values: $\lambda_{L-1}, \lambda_{L-2}, \ldots,$ and $\lambda_{L-N}$. A value of N is not limited in this embodiment. The first beam and the second beam may alternatively have different quantities of wavelength values. That the first beam and the second beam have different wavelength ranges may further indicate that there are no same wavelength values in $\lambda_{c-1}, \lambda_{c-2}, \ldots,$ and $\lambda_{c-N}$ and $\lambda_{L-1}, \lambda_{L-2}, \ldots,$ and $\lambda_{L-N}$. That the first beam and the second beam have different wavelength ranges may alternatively indicate that there are one or more different wavelength values in $\lambda_{c-1}, \lambda_{c-2}, \ldots,$ and $\lambda_{c-N}$ from $\lambda_{L-1}, \lambda_{L-2}, \ldots,$ and $\lambda_{L-N}$, in other words, there are some same wavelength values and some different wavelength values in $\lambda_{c-1}, \lambda_{c-2}, \ldots,$ and $\lambda_{c-N}$ and $\lambda_{L-1}, \lambda_{L-2}, \ldots,$ and $\lambda_{L-N}$.

The following describes a process in which the optical switching apparatus shown in this embodiment deflects the transmission directions of the first beam and the second beam.

For example, as shown in FIG. 4, the input port 41 included in the optical switching apparatus is configured to input the first beam and the second beam (each shown by a solid line that is input by the input port 41 and that is shown in FIG. 3 and FIG. 4). That is, in this embodiment, an example description is provided by using an example in which the first beam and the second beam are input to the optical switching apparatus by using the same input port 41. It should be noted that, in another example, the first beam and the second beam may be alternatively input to the optical switching apparatus by using different input ports. This is not limited.

Optionally, the first beam and the second beam that are input by using the input port 41 are transmitted to a first collimation lens 302. Further, the input port 41 is located at a front focus of the first collimation lens 302, and the first collimation lens 302 is configured to collimate the first beam and the second beam from the input port 41.

In this embodiment, a first lens component is further disposed between the first collimation lens 302 and a second filter 303. A quantity of lenses included in the first lens component is not limited in this embodiment, provided that the first lens component can transmit a collimated first beam and a collimated second beam from the first collimation lens 302 to the second filter 303. In this embodiment, an example description is provided by using an example in which the first lens component includes a first lens 304, a second lens 305, a third lens 306, and a fourth lens 307. The following provides an example description of functions of the lenses (the first lens 304, the second lens 305, the third lens 306, and the fourth lens 307) shown in this example.

The first lens 304 is configured to shape the first beam and the second beam in the second direction Y (in the YZ plane), the second lens 305 is configured to transmit the first beam and the second beam from the first lens 304 to the third lens 306, and the third lens 306 is configured to shape the first beam and the second beam in the first direction X (in an XZ plane). The shaping shown in this embodiment may mean adjusting a size of a flare generated when the first beam is irradiated onto the redirection component 301 and a size of a flare generated when the second beam is irradiated onto the redirection component 301. The fourth lens 307 is configured to transmit a shaped first beam and a shaped second beam to the second filter 303.

The following provides an example description of locations of the lenses (the first lens 304, the second lens 305, the third lens 306, and the fourth lens 307) included in the first lens component.

A rear focus of the first collimation lens 302 overlaps a front focus of the first lens 304, and a distance between the first collimation lens 302 and the first lens 304 is equal to a sum of a focal length of the first collimation lens 302 and a focal length of the first lens 304. A rear focus of the first lens 304 overlaps a front focus of the third lens 306, and a rear focus of the third lens 306 overlaps a front focus of the fourth lens 307. In addition, the rear focus of the first collimation lens 302 overlaps a front focus of the second lens 305, a distance between the first collimation lens 302 and the second lens 305 is equal to a sum of the focal length of the first collimation lens 302 and a focal length of the second lens 305, and the second lens 305 is located between the first lens 304 and the third lens 306. It can be learned that the focal length of the second lens 305 is greater than the focal length of the first lens 304. It should be noted that the description of the lenses included in the first lens component in this embodiment is an optional example, and no limitation is imposed, provided that the first lens component can transmit the first beam and the second beam to the second filter 303.

A second lens component is further disposed between the redirection component 301 and the second filter 303 in this embodiment. A quantity of lenses included in the second lens component is not limited in this embodiment, provided that the second lens component can transmit, to the redirection component 301, a beam emergent from the second filter 303. In this embodiment, an example description is provided by using an example in which the second lens component includes a fifth lens 310.

Further, the second filter 303 is disposed between the fourth lens 307 and the dispersion component (a first grating 308 and a second grating 309 that are shown in FIG. 3). A specific location of the second filter 303 is not limited in this embodiment, provided that the second filter 303 is located between the fourth lens 307 and the dispersion component. Specific locations of the first grating 308 and the second grating 309 are not limited in this embodiment, provided that the second filter 303 can focus the first beam onto the first grating 308 and the second filter 303 can further focus the second beam onto the second grating 309. The second grating 309 is used as an example. The second grating 309 is located at a location at which a rear focus of the fourth lens 307 overlaps a front focus of the fifth lens 310.

The fifth lens 310 is located between the second filter 303 and the redirection component 301, and the redirection component 301 is located at a rear focus of the fifth lens 310. It can be learned that a distance between the redirection component 301 and the fifth lens 310 is equal to a focal length of the fifth lens 310.

It can be learned from FIG. 3 that, in the YZ plane, in this embodiment, an example description is provided by using an example in which the fourth lens 307 transmits the first beam and the second beam to a same location (a location that is shown in FIG. 3 and at which a solid line emergent from the fourth lens 307 intersects with the second filter 303) in the second filter 303. In another example, the fourth lens 307 may alternatively transmit the first beam and the second beam to different locations of the second filter 303.

The second filter 303 shown in this embodiment is configured to respectively change the transmission directions of the first beam and the second beam based on the bands to which the first beam and the second beam belong, and respectively transmit the first beam and the second beam to the first grating 308 and the second grating 309 at different locations.

Further, the second filter 303 is configured to enable the first beam and the second beam to be emergent from the second filter 303 in different directions, so that separation between a transmission direction of the first beam and a transmission direction of the second beam is implemented in the YZ plane. For better understanding, the following provides descriptions with reference to a structure of the second filter 303.

Figure 6:
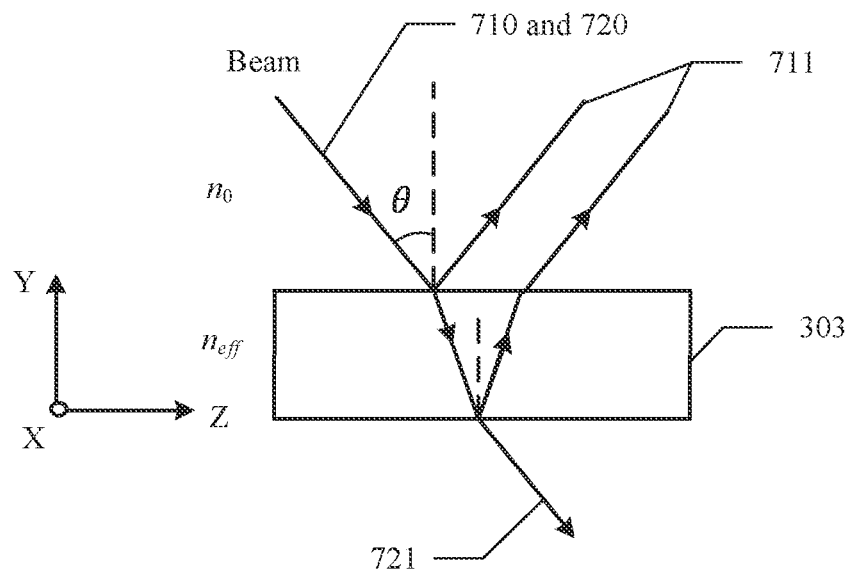
FIG. 6 is an example diagram in which beams are incident onto a thin film filter according to this application.
Figure 7:
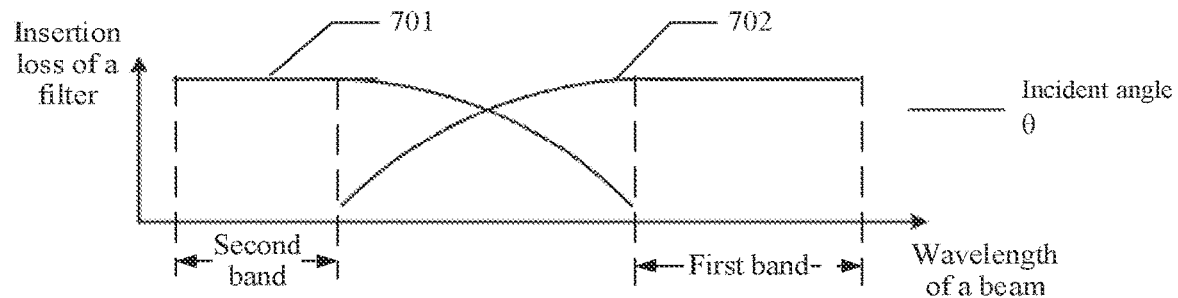
FIG. 7 is a first example diagram of a filter spectrum of a thin film filter according to this application.

In this embodiment, for example, the second filter 303 is a thin film filter. The thin film filter may be a dichroic filter. As shown in FIG. 6, in the YZ plane (the plane extending in both the second direction Y and the third direction Z), the beams are incident onto the second filter 303 at an incident angle θ. For better understanding, the following continues to make reference to FIG. 7. FIG. 7 is an example diagram of a filter spectrum of the thin film filter. The filter spectrum includes two curves, that is, a pass-through curve 701 of pass-through light and a reflection curve 702 of reflected light. A first beam 710 shown in this embodiment falls within a first band shown in FIG. 7, so that the first beam 710 falling within the first band is emergent from the second filter 303 in a reflected-light transmission manner under the action of an insertion loss corresponding to the first band, that is, a transmission direction of the first beam 710 is changed after the first beam 710 becomes reflected light. To better distinguish between a first beam existing before the transmission direction is changed and a first beam obtained after the transmission direction is changed, before the transmission direction is changed, the first beam is the first beam 710 shown in FIG. 3 and FIG. 6, and after the transmission direction is changed after the first beam is reflected by the second filter 303, the first beam is a first beam 711 shown in FIG. 3 and FIG. 6. It can be learned, with reference to transmission directions of the first beam 710 and the first beam 711, the transmission direction of the first beam 710 is changed to a transmission direction of the first beam 711 due to a reflection action of the second filter 303 for the first beam 710.

A second beam 720 shown in this embodiment falls within a second band shown in FIG. 7, so that the second beam 720 falling within the second band is emergent from the second filter 303 in a pass-through-light transmission manner under the action of an insertion loss corresponding to the second band, that is, a transmission direction of the second beam 720 is changed after the second beam 720 becomes pass-through light. To better distinguish between a second beam existing before the transmission direction is changed and a second beam obtained after the transmission direction is changed, before the transmission direction is changed, the second beam is the second beam 720 shown in FIG. 3 and FIG. 6, and after the transmission direction is changed after the second beam passes through the second filter 303, the second beam is a second beam 721 shown in FIG. 3 and FIG. 6. It can be learned, with reference to transmission directions of the second beam 720 and the second beam 721, the transmission direction of the second beam 720 is changed to a transmission direction of the second beam 721 due to a pass-through action of the second filter 303 for the second beam 720.

It should be noted that a range of the first band and a range of the second band are not limited in this embodiment, provided that beams falling within different bands are transmitted in different transmission directions under the action of the second filter 303.

Further, it can be learned from FIG. 3 that the second filter 303 transmits, to the first grating 308, the first beam 711 obtained after the transmission direction is changed, and transmits, to the second grating 309, the second beam 721 obtained after the transmission direction is changed. The first grating 308 and the second grating 309 that are shown in this embodiment are located at different locations. Specific locations of the first grating 308 and the second grating 309 are not limited in this embodiment, provided that the first grating 308 is located on an optical transmission path of the first beam 711, and the second grating 309 is located on an optical transmission path of the second beam 721, to ensure that the first beam 711 can be successfully transmitted to the first grating 308 and the second beam 721 can be successfully transmitted to the second grating 309.

In this embodiment, an example description is provided by using an example in which the first grating 308 and the second grating 309 are two independent gratings at different locations. In another example, the first grating 308 and the second grating 309 may be alternatively two areas of a curved grating.

The first grating 308 is configured to decompose the first beam 711 into a plurality of first sub-beams 712 (each shown by a solid line emergent from the first grating 308). For example, the first grating 308 decomposes the first beam 711 into N first sub-beams 712, and wavelengths of the N first sub-beams 712 are respectively $\lambda_{c-1}, \lambda_{c-2}, \ldots,$ and $\lambda_{c-N}$. The second grating 309 is configured to decompose the second beam 721 into a plurality of second sub-beams 722 (each shown by a dashed line emergent from the second grating 309). For example, the second grating 309 decomposes the second beam 721 into N second sub-beams, and wavelengths of the N second sub-beams are respectively $\lambda_{L-1}, \lambda_{L-2}, \ldots,$ and $\lambda_{L-N}$. For descriptions of $\lambda_{c-1}, \lambda_{c-2}, \ldots,$ and $\lambda_{c-N}$ and $\lambda_{L-1}, \lambda_{L-2}, \ldots,$ and $\lambda_{L-N}$, refer to the foregoing descriptions. Details are not described again.

The first grating 308 is further configured to transmit the plurality of first sub-beams 712 to the second filter 303, and the second grating 309 is further configured to transmit the plurality of second sub-beams 722 to the second filter 303. It can be learned that the second filter 303 shown in this embodiment is disposed on optical transmission paths of the plurality of first sub-beams 712 and the plurality of second sub-beams 722, thereby effectively ensuring that the plurality of first sub-beams 712 and the plurality of second sub-beams 722 can be successfully transmitted to the second filter 303.

It can be learned from FIG. 5 that, to improve a filtering bandwidth, flares generated by the plurality of first sub-beams 712 need to be located in the first area 501, and flares generated by the plurality of second sub-beams 722 need to be located in the second area 502. For better understanding, the following provides descriptions with reference to flares.

A first flare (located in the first area 501) generated by a first target sub-beam on the redirection component 301 and a second flare (located in the second area 502) generated by a second target sub-beam on the redirection component 301 overlap in the second direction Y The first target sub-beam is one of the plurality of first sub-beams 712 generated by the first grating 308, and the second target sub-beam is one of the plurality of second sub-beams 722 generated by the second grating 309. The first grating 308 and the second grating 309 that are shown in this embodiment can effectively ensure that the first flare and the second flare overlap in the second direction Y The following provides descriptions.

First, the first flare and the second flare are described.

Figure 8:
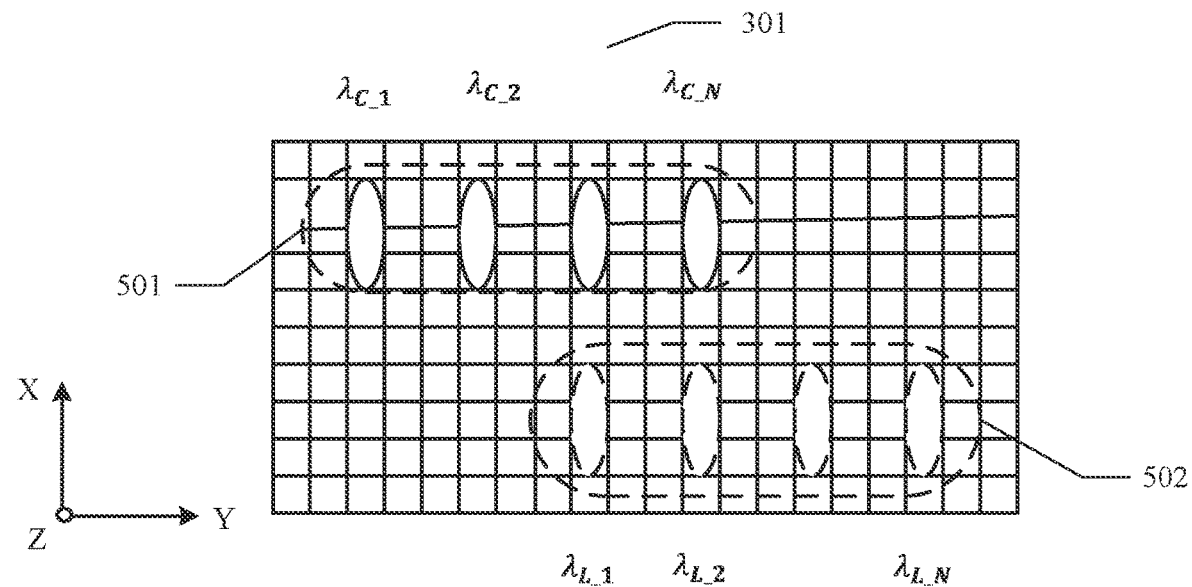
FIG. 8 is an example diagram of a second arrangement of flares on a redirection component according to this application.

Further, referring to FIG. 5, the flares of the first sub-beams 712 are arranged in the first area 501 shown in FIG. 5, the flares of the second sub-beams 722 are arranged in the second area 502 shown in FIG. 5, and the first area 501 and the second area 502 that are shown in this embodiment overlap in the second direction Y In this embodiment, an example description is provided by using an example in which the first area 501 and the second area 502 completely overlap in the second direction Y In another example, the first area 501 and the second area 502 may alternatively partially overlap (as shown in FIG. 8).

The first flare is a flare generated by the first target sub-beam on the redirection component 301, the second flare is a flare generated by the second target sub-beam on the redirection component 301, and a ranking of the first flare in the plurality of flares generated by the plurality of first sub-beams 712 is the same as a ranking of the second flare in the plurality of flares generated by the plurality of second sub-beams 722, in other words, a ranking of the first flare in the plurality of flares included in the first area 501 is the same as a ranking of the second flare in the plurality of flares included in the second area 502.

For example, the first flare is a flare generated when a first target sub-beam having a wavelength $\lambda_{c\_1}$ is incident onto the redirection component 301, and the second flare is a flare generated when a second target sub-beam having a wavelength $\lambda_{L\_1}$ is incident onto the redirection component 301, that is, the ranking of the first flare in the plurality of flares included in the first area 501 and the ranking of the second flare in the plurality of flares included in the second area 502 are both first. For another example, the first flare is a flare generated when a first target sub-beam having a wavelength $\lambda_{c\_N}$ is incident onto the redirection component 301, and the second flare is a flare generated when a second target sub-beam 722 having a wavelength $\lambda_{L\_N}$ is incident onto the redirection component 301, that is, the ranking of the first flare in the plurality of flares included in the first area 501 and the ranking of the second flare in the plurality of flares included in the second area 502 are both $N^{th}$. A specific value of N is not limited in this embodiment, provided that N is equal to a positive integer greater than or equal to 1.

To implement overlapping between the first area 501 and the second area 502 in the second direction Y, the plurality of first sub-beams 712 emergent from the first grating 308 are transmitted to a third area of the second filter 303, the plurality of second sub-beams 722 emergent from the second grating 309 are transmitted to a fourth area of the second filter 303, and the third area and the fourth area overlap in the second direction Y.

Further, to implement overlapping between the first flare and the second flare in the second direction Y, a location that is in the second filter 303 and to which the first target sub-beam emergent from the first grating 308 is transmitted and a location that is in the second filter 303 and to which the second target sub-beam emergent from the second grating 309 is transmitted need to overlap in the second direction Y (in the YZ plane).

In another example, to implement partial overlapping between the first area 501 and the second area 502 in the second direction Y, the third area and the fourth area may partially overlap. Further, to implement partial overlapping between the first flare and the second flare in the second direction Y, a location that is in the second filter 303 and to which the first target sub-beam emergent from the first grating 308 is transmitted and a location that is in the second filter 303 and to which the second target sub-beam emergent from the second grating 309 is transmitted need to be close in the second direction Y (in the YZ plane). A closeness degree is not limited in this embodiment, provided that the first flare and the second flare partially overlap in the second direction Y.

To implement overlapping between the location that is in the second filter 303 and to which the first target sub-beam emergent from the first grating 308 is transmitted and the location that is in the second filter 303 and to which the second target sub-beam emergent from the second grating 309 is transmitted, a value of an angle at which the first beam is incident onto the first grating 308 in the YZ plane may be adjusted, to adjust a value of an angle at which the first target sub-beam is emergent from the first grating 308, thereby adjusting the location that is in the second filter 303 and to which the first target sub-beam is transmitted. For a process of adjusting the location that is in the second filter 303 and to which the second target sub-beam is transmitted, refer to the description of the location that is in the second filter 303 and to which the first target sub-beam is transmitted. Details are not described. It can be learned that, the location that is in the second filter 303 and to which the first target sub-beam is transmitted and the location that is in the second filter 303 and to which the second target sub-beam is transmitted are adjusted, to implement overlapping or partial overlapping between the first flare and second flare on the redirection component 301.

For example, the angle at which the first target sub-beam is emergent from the first grating 308 may be adjusted by using the following Formula 1: $d(\sin \alpha + \sin \beta) = m\lambda$, where $\alpha$ is the angle at which the first beam is incident onto the first grating 308 in the YZ plane, $\beta$ is the angle at which the first target sub-beam is emergent from the first grating 308, d is a distance between two adjacent grating lines in the first grating 308, and m is a grating diffraction order and is a constant.

It can be learned from the formula 1 that, if the first target sub-beam is still used as an example, a location of the first grating 308 may be adjusted to adjust the value of the incident angle $\alpha$ at which the first beam is incident onto the first grating 308 in the YZ plane, thereby adjusting the value of the emergent angle $\beta$ at which the first target sub-beam is emergent from the first grating 308.

A process in which the second filter 303 transmits the first target sub-beam and the second target sub-beam to the redirection component 301 is described by still using the first target sub-beam and the second target sub-beam as an example.

Figure 9:
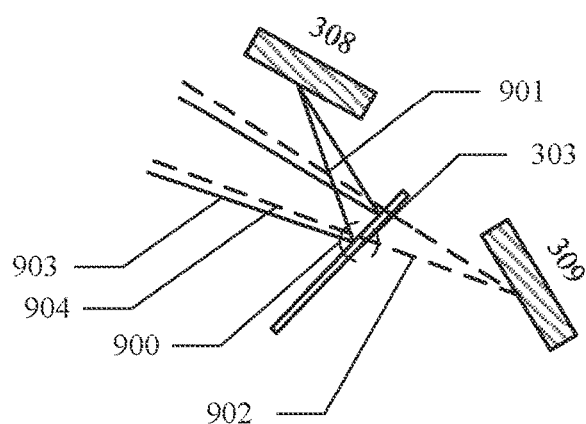
FIG. 9 is an enlarged example diagram of a partial structure of the optical switching apparatus shown in FIG. 3.

Further, refer to FIG. 9. FIG. 9 is an example diagram of a partial structure of the optical switching apparatus shown in FIG. 3. In FIG. 9, a first target sub-beam 901 and a second target sub-beam 902 are incident onto a same location in the second filter 303, namely, a location 900 shown in FIG. 9. With reference to FIG. 3 and FIG. 9, the second filter 303 needs to transmit the first target sub-beam 901 and the second target sub-beam 902 that overlap in the second direction Y (in the YZ plane) to the redirection component 301. Further, to implement transmission of the first target sub-beam 901 to the redirection component 301, the second filter 303 needs to transmit the first target sub-beam 901 to the redirection component 301 as reflected light 903 (shown by a solid line that is emergent from the second filter 303 and that is shown in FIG. 9), and the second filter 303 further needs to transmit the second target sub-beam 902 to the redirection component 301 as pass-through light 904 (shown by a dashed line that is emergent from the second filter 303 and that is shown in FIG. 9). It can be learned that a beam belonging to the first band is reflected from the second filter 303 as reflected light at both the first time at which the beam is incident onto the second filter 303 (the first beam 710 is incident onto the second filter 303) and the second time at which the beam is incident onto the second filter 303 (the first target sub-beam 901 is incident onto the second filter 303). It can be further learned that a beam belonging to the second band passes through the second filter 303 as pass-through light at both the first time at which the beam is incident onto the second filter 303 (the second beam 720 is incident onto the second filter 303) and the second time at which the beam is incident onto the second filter 303 (the second target sub-beam 902 is incident onto the second filter 303).

The following describes how the second filter 303 shown in this embodiment effectively ensures that a beam belonging to the first band is reflected light at both two consecutive times of being incident onto the second filter 303.

First, a disadvantage of an existing thin film filter is described.

For the existing thin film filter, when a beam belonging to a same band is incident onto the thin film filter at different incident angles at two consecutive times, a filter spectrum shifts. A description is provided by using Formula 2:

$$\lambda_\theta = \lambda_0 \sqrt{1 - \left(\frac{n_0}{n_{eff}} \sin \theta\right)^2}.$$

With reference to FIG. 6, $\lambda_0$ is a wavelength at which a beam is incident onto the thin film filter 303 in a direction perpendicular to the thin film filter 303, $n_0$ is an effective refractive index of a medium in which the beam is located before being incident onto the thin film filter 303, and $n_{eff}$ is an effective refractive index of the thin film filter 303. It can be learned from the formula 2 that, when the beam is incident onto the thin film filter 303 at different incident angles θ at two consecutive times in the YZ plane, a value of a wavelength $\lambda_\theta$ of the beam is changed. It can be learned from FIG. 7 that, wavelengths $\lambda_\theta$ of different beams correspond to different filter insertion losses, and consequently a filter spectrum shifts. The following provides an example description with reference to a specific example.

Figure 10:
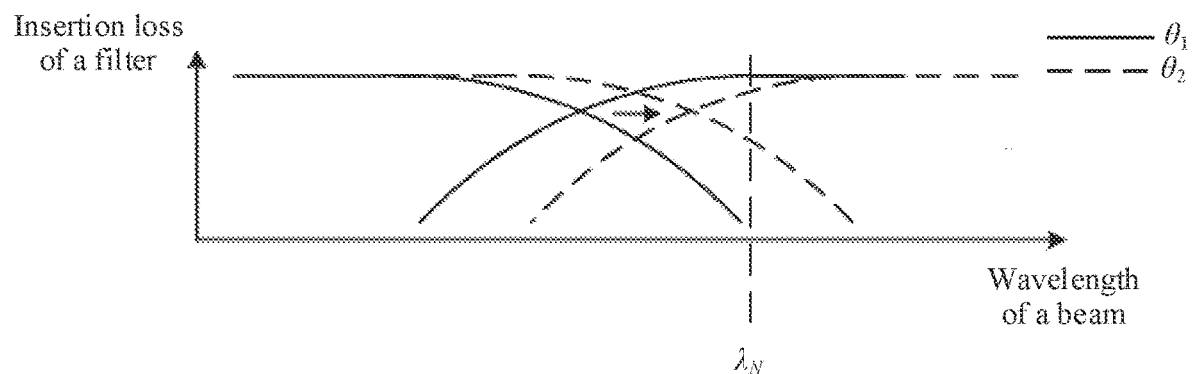
FIG. 10 is another example diagram of a filter spectrum of a thin film filter according to this application.

For example, the beam is incident onto the thin film filter at an incident angle $\theta_1$ at the first time, and in this case, a filter spectrum of the thin film filter is of a solid-line spectrum shape shown in FIG. 10, and the beam is incident onto the thin film filter at an incident angle $\theta_2$ at the second time, and in this case, a filter spectrum of the thin film filter is of a dashed-line spectrum shape shown in FIG. 10. Absolute values of $\theta_1$ and $\theta_2$ are not equal to each other.

Because the filter spectrum shifts (the filter spectrum shifts from the solid-line spectrum shape to the dashed-line spectrum shape), a manner in which the thin film filter transmits the beam is changed. For example, a beam has a wavelength $\lambda_N$, and $\lambda_N$ belongs to the first band. When the beam of $\lambda_N$ is incident onto the thin film filter at $\theta_1$ at the first time, based on a filter spectrum of the solid-line spectrum shape and a filter insertion loss corresponding to $\lambda_N$, the thin film filter can transmit the beam in the following manner. The thin film filter reflects the beam of $\lambda_N$ as reflected light.

When the beam of $\lambda_N$ is incident onto the thin film filter at $\theta_2$ at the second time, based on a filter spectrum of the dashed-line spectrum shape and two filter insertion losses corresponding to $\lambda_N$, the thin film filter can transmit the beam in the following manner. The thin film filter reflects a part of energy of the beam of $\lambda_N$ as reflected light, and enables the other part of the energy to pass as pass-through light. Even in another example, a transmission manner used when a beam belonging to a same band is incident onto the thin film filter at the first time is reflected light, and a transmission manner used when the beam is incident onto the thin film filter at the second time is pass-through light. It can be learned that when a filter spectrum shifts, a transmission manner of a beam is changed, for example, changed from a reflected-light transmission direction to a pass-through-light transmission direction, or changed from a pass-through-light transmission direction to a reflected-light transmission direction.

It can be learned that, if a filter spectrum of the second filter 303 shown in this embodiment shifts, some sub-beams emergent from the second filter 303 cannot be successfully transmitted to the redirection component 301. For example, only when the first target sub-beam 901 is all used as reflected light 903, it can be ensured that the first target sub-beam 901 can be successfully transmitted to the redirection component 301. If a transmission manner of at least a part of energy of the first target sub-beam 901 is changed to pass-through light, there is a disadvantage that the at least the part of the energy of the first target sub-beam 901 cannot be successfully transmitted to the redirection component 301, resulting in an increase in an insertion loss of the optical switching apparatus.

To effectively ensure that the first sub-beams and the second sub-beams that are emergent from the second filter 303 can be successfully transmitted to the redirection component 301, transmission manners used at two consecutive times at which a beam belonging to a same band is incident onto the second filter 303 need to be consistent. For example, if a beam belonging to the first band is reflected as reflected light when being incident onto the second filter 303 at the first time, the beam belonging to the first band is also reflected as reflected light when being incident onto the second filter 303 at the second time. To implement this objective, based on locations that are in the second filter 303 and onto which the beam belonging to the first band is incident at the two consecutive times, the second filter 303 shown in this embodiment is divided into two areas: a first reflection area and a second reflection area. With reference to the foregoing example, the first beam 710 is incident onto the first reflection area of the second filter 303 at an incident angle θ₁, and the first target sub-beam 901 is incident onto the second reflection area of the second filter 303 at the incident angle θ₂. For descriptions of θ₁ and θ₂, refer to the foregoing descriptions. Details are not described again.

In this embodiment, it is ensured, by using the following formula 3, that a beam belonging to the first band is incident onto the second filter 303 at two times in consistent transmission manners:

$$\frac{\sin|\theta_1|}{n_{\mathit{eff}1}} = \frac{\sin|\theta_2|}{n_{\mathit{eff}2}}, \qquad \text{Formula 3}$$

where $n_{\mathit{eff}}$ is the effective refractive index of a reflection area.

An effective refractive index $n_{\mathit{eff}1}$ of the first reflection area is different from an effective refractive index $n_{\mathit{eff}2}$ of the second reflection area. Provided that the effective refractive indexes and the incident angles of the first reflection area and the second reflection area of the second filter 303 shown in this embodiment meet the formula 3, a beam belonging to the first band can be reflected from the second filter 303 as reflected light at both two consecutive times of being incident onto the second filter 303, so that all the first sub-beams of the first beam 710 can be transmitted to the redirection component 301.

If the second filter 303 shown in this embodiment meets the foregoing formula 3, when a beam belonging to the first band is incident onto the second filter 303 at two consecutive times, the filter spectrum of the second filter 303 does not shift, so that a difference between a first insertion loss caused when the first target sub-beam included in the first beam 710 is incident onto the second filter 303 at the incident angle θ₁ and a second insertion loss caused when the first target sub-beam 901 is incident onto the second filter 303 at the incident angle θ₂ is less than or equal to a third preset value. The first target sub-beam included in the first beam 710 and the first target sub-beam 901 have a same wavelength. The third preset value is not limited in this embodiment, provided that the first insertion loss is equal to or approximately equal to the second insertion loss. It can be learned that, when the difference between the first insertion loss and the second insertion loss is less than or equal to the third preset value, it can be effectively ensured that the filter spectrum of the second filter 303 does not shift.

For a description about how the second filter 303 shown in this embodiment effectively ensures that a beam belonging to the second band is pass-through light at two consecutive times of being incident onto the second filter 303, refer to the foregoing description of ensuring that a beam belonging to the first band is used as reflected light at two consecutive times of being incident onto the second filter 303.

The following describes a process in which the plurality of first sub-beams reflected from the second filter 303 and the plurality of second sub-beams passing through the second filter 303 are transmitted to the redirection component 301.

Further, referring to FIG. 3 and FIG. 4, the second filter 303 transmits the plurality of first sub-beams (each shown by a solid line that is emergent from the second filter 303 and that is shown in FIG. 3) and the plurality of second sub-beams (each shown by a dashed line that is emergent from the second filter 303 and that is shown in FIG. 3) to the fifth lens 310. The fifth lens 310 shown in this embodiment is configured to change transmission directions of the plurality of first sub-beams and the plurality of second sub-beams, so that the plurality of first sub-beams and the plurality of second sub-beams are separately transmitted to a first filter 311 in directions parallel to an optical axis of the fifth lens 310. It should be noted that in this embodiment, an example description is provided by using an example in which the plurality of first sub-beams and the plurality of second sub-beams are transmitted in the directions parallel to the optical axis of the fifth lens 310, and no limitation is imposed, provided that the plurality of first sub-beams and the plurality of second sub-beams can be successfully transmitted to the first filter 311.

It can be learned from the foregoing description of the second filter 303 that the optical switching apparatus can enable, by using the first grating 308, the second grating 309, and the second filter 303, the first target sub-beam and the second target sub-beam to overlap in the second direction Y, thereby ensuring that the first flare of the first target sub-beam and the second flare of the second target sub-beam overlap in the second direction Y The following describes a process in which the optical switching apparatus shown in this embodiment separates transmission directions of the plurality of first sub-beams and transmission directions of the plurality of second sub-beams in the first direction X, thereby effectively ensuring that the first flare and the second flare are separated in the first direction X.

To implement separation between the transmission directions of the plurality of first sub-beams and the plurality of second sub-beams in the first direction X, the optical switching apparatus shown in this embodiment further includes a first reflector 312 and a second reflector 313 (that are shown in FIG. 4). The first filter 311 is configured to reflect a plurality of first sub-beams 401 belonging to the first band to the first reflector 312 as reflected light, and the first filter 311 is further configured to enable a plurality of second sub-beams 402 belonging to the second band to pass through the second reflector 313 as pass-through light. For descriptions of the reflected light and the pass-through light, refer to the foregoing description of the second filter 303. Details are not described again.

It can be learned that the transmission directions of the plurality of first sub-beams 401 belonging to the first band and the plurality of second sub-beams 402 belonging to the second band can be separated into different transmission directions in the XZ plane by using the first filter 311, to be respectively transmitted to the first reflector 312 and the second reflector 313 at different locations.

Specific locations of the first reflector 312 and the second reflector 313 are not limited in this embodiment, provided that the first reflector 312 is disposed on optical transmission paths of the plurality of first sub-beams 401, that is, the first reflector 312 is disposed on optical transmission paths on which the plurality of first sub-beams 401 are reflected from the first filter 311 and transmitted to the redirection component 301, and the second reflector 313 is disposed on optical transmission paths of the plurality of second sub-beams 402 passing through the first filter 311, that is, the second reflector 313 is disposed on optical transmission paths on which the plurality of second sub-beams 402 pass through the first filter 311 and are transmitted to the redirection component 301.

Figure 11:
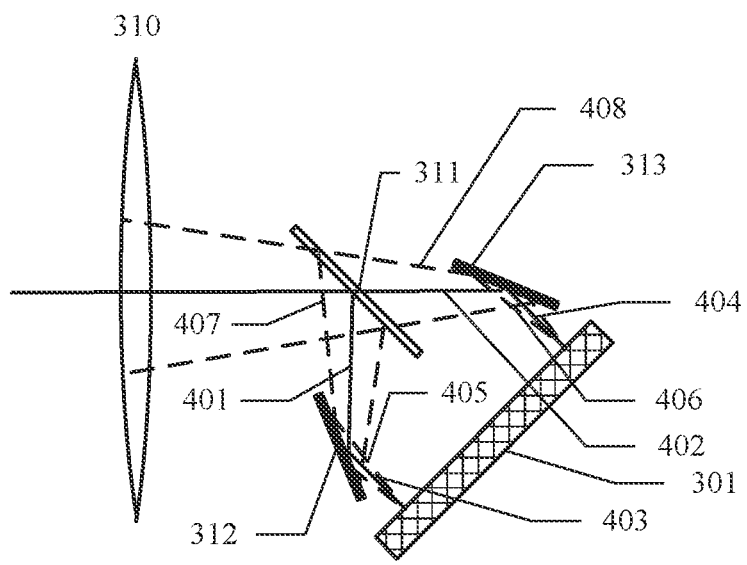
FIG. 11 is an enlarged example diagram of a partial structure of the optical switching apparatus shown in FIG. 4.

For clearer understanding, the following provides descriptions with reference to FIG. 4 and FIG. 11. FIG. 11 is an enlarged example diagram of a partial structure of the optical switching apparatus shown in FIG. 4. A plurality of first sub-beams 403 (each shown by a solid line emergent from the first reflector 312) reflected from the first reflector 312 are irradiated onto the first area 501 shown in FIG. 5. It should be noted that different reference signs of the first sub-beam and different reference signs of the second sub-beam in this embodiment are only used to indicate, through distinguishing, a change of a transmission path of the first sub-beam and a change of a transmission path of the second sub-beam. A plurality of second sub-beams 404 (each shown by a solid line emergent from the second reflector 313) reflected from the second reflector 313 are irradiated onto the second area 502 shown in FIG. 5. It can be learned that the first area 501 and the second area 502 that are shown in this embodiment are separated in the first direction X and overlap or partially overlap in the second direction Y, so that the optical switching apparatus shown in this embodiment can effectively improve filtering bandwidths of the first beam and the second beam.

The redirection component 301 is configured to deflect transmission directions of the first sub-beams 403, and after the transmission directions of the first sub-beams 403 are deflected by using the redirection component 301, the first sub-beams 403 are transmitted to the first reflector 312 as redirected first sub-beams 405 (each shown by a dashed line emergent from the redirection component 301). The redirection component 301 is further configured to deflect transmission directions of the second sub-beams 404, and after the transmission directions of the second sub-beams 404 are deflected by using the redirection component 301, the second sub-beams 404 are transmitted to the second reflector 313 as redirected second sub-beams 406 (each shown by a dashed line emergent from the redirection component 301).

It can be learned that the first reflector 312 shown in this embodiment is further disposed on optical transmission paths of the first sub-beams 405 emergent from the redirection component 301, and the second reflector 313 is further disposed on optical transmission paths of the second sub-beams 406 emergent from the redirection component 301.

In the XZ plane, the plurality of first sub-beams 405 obtained after transmission direction deflection is performed by using the redirection component 301 may be emergent at one emergent angle, or may be emergent at a plurality of emergent angles. Details are not described in this embodiment. For example, if the plurality of first sub-beams 405 are output from the optical switching apparatus along a same output port (for example, the output port 42), the plurality of first sub-beams 405 can be emergent from the redirection component 301 at a same emergent angle, so that the plurality of first sub-beams can be transmitted to the output port 42 for output. If the plurality of first sub-beams 405 are output along two output ports (for example, the output port 42 and the output port 43), the plurality of first sub-beams 405 can be emergent from the redirection component 301 at two different emergent angles, so that some of the first sub-beams 405 are output from the output port 42 and some of the first sub-beams 405 are output from the output port 43. For a description of emergence of the second sub-beams 406 from the redirection component 301, refer to the process in which the first sub-beams 405 are emergent from the redirection component 301. Details are not described.

The first reflector 312 is configured to reflect the first sub-beams 405 from the redirection component 301 to the first filter 311, that is, the first reflector 312 is configured to reflect first sub-beams 407 (each shown by a dashed line emergent from the first reflector 312) to the first filter 311. The second reflector 313 is configured to reflect the second sub-beams 406 from the redirection component 301 to the first filter 311, that is, the second reflector 313 is configured to reflect second sub-beams 408 (each shown by a dashed line emergent from the second reflector 313) to the first filter 311.

Further, the first reflector 312 is configured to transmit a first target sub-beam to a fifth area on the first filter 311, and the second reflector 313 is configured to transmit a second target sub-beam to a sixth area on the first filter 311. It can be learned from the foregoing description that the first target sub-beam is one of the plurality of first sub-beams, and the second target sub-beam is one of the plurality of second sub-beams. In this embodiment, to output the first target sub-beam and the second target sub-beam by using a same port (for example, the output port 42), the fifth area and the sixth area need to completely or partially overlap. If the first target sub-beam and the second target sub-beam need to be output by using different output ports (for example, the output port 42 and the output port 43), the fifth area and the sixth area are areas that do not overlap each other.

In this embodiment, in order that the first filter 311 successfully transmits the first sub-beams to an output port, a first sub-beam (a first sub-beam from the fifth lens 310) belonging to the first band needs to be reflected as reflected light at the first time of being incident onto the first filter 311, and the first sub-beam (the first sub-beam 407 from the first reflector 312) also needs to be reflected as reflected light at the second time of being incident onto the first filter 311. In order that the first filter 311 successfully transmits the second sub-beams to an output port, a second sub-beam (a second sub-beam from the fifth lens 310) belonging to the second band needs to pass as pass-through light at the first time of being incident onto the first filter 311, and the second sub-beam (the second sub-beam 408 from the second reflector 313) also needs to pass as pass-through light at the second time of being incident onto the first filter 311.

In this embodiment, for a process in which the first filter 311 effectively ensures that a first sub-beam is reflected light at both two consecutive times of being incident onto the first filter 311, refer to the foregoing process that is shown in FIG. 9 and in which the second filter 303 effectively ensures that a beam belonging to the first band is reflected light at both two consecutive times of being incident onto the second filter 303. Details are not described. For a process in which the first filter 311 effectively ensures that a second sub-beam is pass-through light at both two consecutive times of being incident onto the first filter 311, refer to the foregoing process that is shown in FIG. 9 and in which the second filter 303 effectively ensures that a beam belonging to the second band is pass-through light at both two consecutive times of being incident onto the second filter 303. Details are not described.

The following describes a process in which the first sub-beams and the second sub-beams that are emergent from the first filter 311 are transmitted to an output port.

The fifth lens 310 is configured to separately transmit first sub-beams 409 and second sub-beams 410 to the second filter 303, and the second filter 303 is configured to reflect the first sub-beams 409 to the first grating 308 based on the first band to which the first sub-beams 409 belong. The second filter 303 is further configured to enable, based on the second band to which the second sub-beams 410 belong, the second sub-beams 410 to reach the second grating 309 through passing. For a reflection process and a pass-through process, refer to those shown in FIG. 6 and FIG. 7. Details are not described again.

As shown in FIG. 3, the first grating 308 is configured to combine the plurality of first sub-beams 409 into a third beam 411 (shown by a solid line emergent from the first grating 308), and the second grating 309 is configured to combine the plurality of second sub-beams 410 into a fourth beam 412 (shown by a dashed line emergent from the second grating 309).

The second filter 303 is configured to reflect the third beam 411 as reflected light based on the first band to which the third beam 411 belongs, so that both a manner in which the second filter 303 transmits the first sub-beams and a manner in which the second filter 303 transmits the third beam 411 are reflected light, thereby effectively ensuring that the first sub-beams can be successfully transmitted to the first grating 308, and further effectively ensuring that the third beam 411 can be successfully transmitted to the fourth lens 307. The second filter 303 is configured to enable the fourth beam 412 to pass as pass-through light based on the second band to which the fourth beam 412 belongs, so that both a manner in which the second filter 303 transmits the second sub-beams and a manner in which the second filter 303 transmits the fourth beam 412 are pass-through light, thereby effectively ensuring that the second sub-beams can be successfully transmitted to the second grating 309, and further effectively ensuring that the fourth beam 412 can be successfully transmitted to the fourth lens 307.

The third beam 411 and the fourth beam 412 sequentially pass through the fourth lens 307, the third lens 306, the second lens 305, and the first lens 304 to adjust optical transmission paths of the third beam 411 and the fourth beam 412, so that the third beam 411 is transmitted to the corresponding output port 42 for output, and the fourth beam 412 is transmitted to the corresponding output port 43 for output. It should be noted that, specific output ports by using which the third beam 411 and the fourth beam 412 are output are not limited in this embodiment. For example, the third beam 411 and the fourth beam 412 may be output from the optical switching apparatus by using a same output port. For another example, the third beam 411 and the fourth beam 412 may be output from the optical switching apparatus by using different output ports.

In this embodiment, in an example in which the third beam 411 is output by using the output port 42 and the fourth beam 412 is output by using the output port 43, the fourth lens 307, the third lens 306, the second lens 305, and the first lens 304 can transmit the third beam 411 to a second collimation lens 314 connected to the output port 42. The third beam 411 is output by using the output port 42 after being collimated by the second collimation lens 314. The fourth lens 307, the third lens 306, the second lens 305, and the first lens 304 can further transmit the fourth beam 412 to a third collimation lens 315 connected to the output port 43. The second beam 412 is output by using the output port 43 after being collimated by the third collimation lens 315.

Beneficial effects of using the optical switching apparatus shown in this embodiment are as follows. No optical component (such as AWG) needs to be disposed in the optical switching apparatus shown in this embodiment, to perform input beam multiplexing and demultiplexing, thereby effectively reducing an insertion loss caused by adding an optical component (such as AWG). In addition, overlapping or partial overlapping between the first area and the second area in the second direction Y is implemented by using the second filter, and separation between the first area and the second area in the first direction X is implemented by using the first filter, thereby effectively improving a filtering bandwidth of the optical switching apparatus.

If the first filter and the second filter that are shown in this embodiment are thin film filters, a same transmission manner is used when a beam belonging to a same band passes through the thin film filter at two consecutive times, for example, the beam is reflected as reflected light at both the two consecutive times, or the beam passes as pass-through light at both the two consecutive times, thereby effectively reducing filtering damage.

Embodiment 2

In Embodiment 1, the first beam and the second beam are input to the optical switching apparatus by using the same input port. In this embodiment, an example description is provided by using an example in which a first beam and a second beam are input to an optical switching apparatus by using different input ports.

Figure 12:
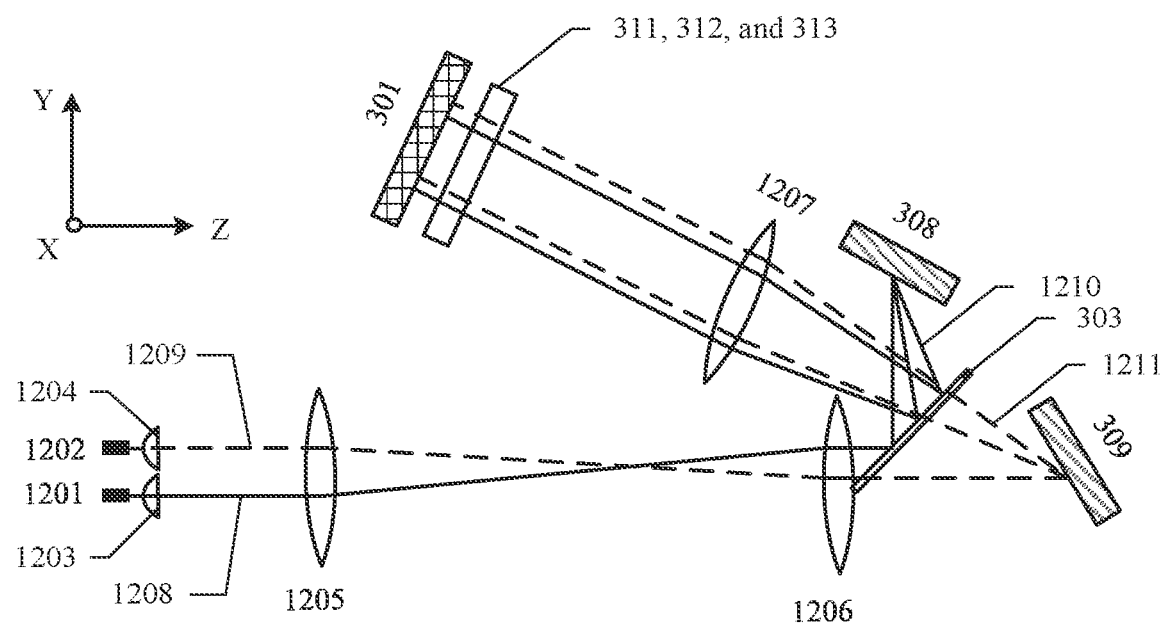
FIG. 12 is an example diagram of a second structure of an optical switching apparatus in a second direction according to this application.
Figure 13:
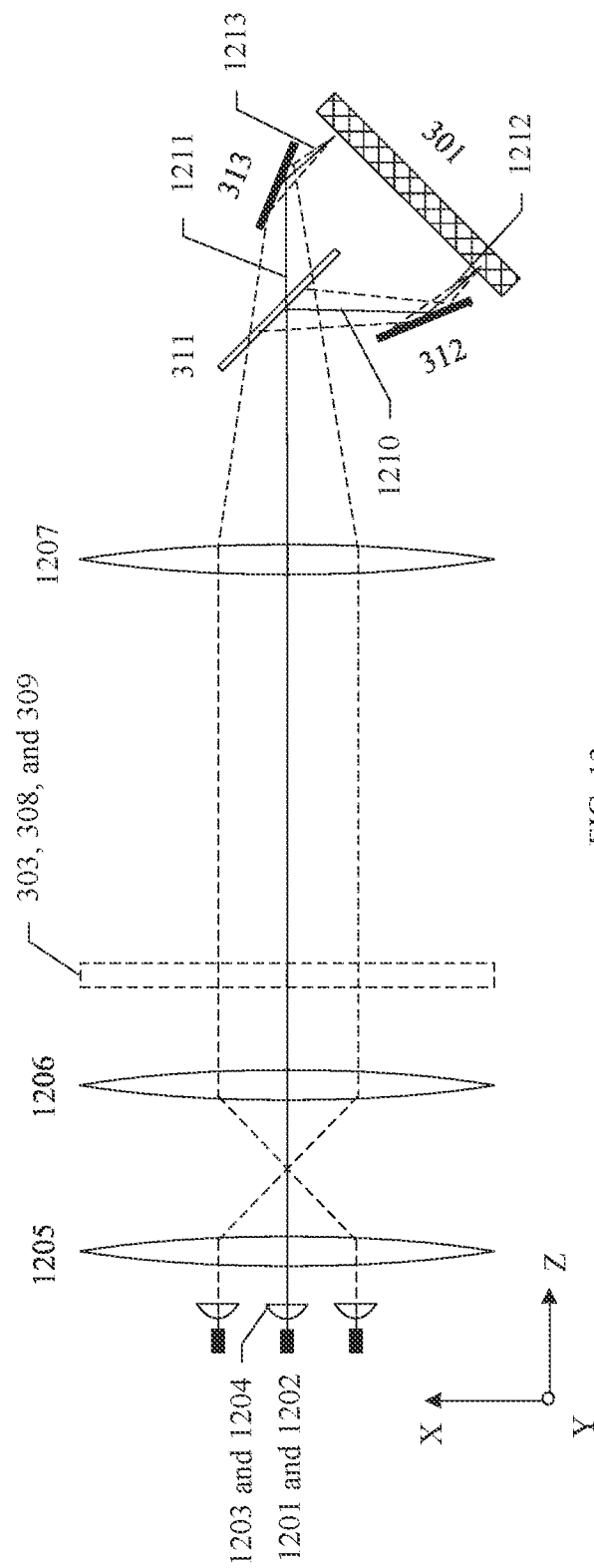
FIG. 13 is an example diagram of a second structure of an optical switching apparatus in a first direction according to this application.

For a structure of the optical switching apparatus shown in this embodiment, refer to FIG. 12 and FIG. 13. FIG. 12 is an example diagram of a structure of the optical switching apparatus in a second direction, and FIG. 13 is an example diagram of a structure of the optical switching apparatus in a first direction. For descriptions of the first direction X, the second direction Y, and a third direction Z, refer to those shown in Embodiment 1. Details are not described again.

The optical switching apparatus shown in this embodiment includes a first input port 1201 and a second input port 1202. It can be learned from the figure that locations of the first input port 1201 and the second input port 1202 are different in the second direction Y Further, locations of the first input port 1201 and the second input port 1202 in a YZ plane are separated and arranged in parallel, and locations of the first input port 1201 and the second input port 1202 in an XZ plane overlap. It should be noted that the description of the locations of the first input port 1201 and the second input port 1202 in the XZ plane in this embodiment is merely an example. For example, in another example, the locations of the first input port 1201 and the second input port 1202 in the XZ plane may be separated. The first input port 1201 shown in this embodiment is configured to input a first beam, and the second input port 1202 is configured to input a second beam. For descriptions of the first beam and the second beam, refer to those shown in Embodiment 1. Details are not described again.

The following describes a process in which the optical switching apparatus shown in this embodiment deflects transmission directions of the first beam and the second beam.

Optionally, the first beam input by using the first input port 1201 is transmitted to a fourth collimation lens 1203, the first input port 1201 is located at a front focus of the fourth collimation lens 1203, and the fourth collimation lens 1203 is configured to collimate the first beam from the first input port 1201. The second beam input by using the second input port 1202 is transmitted to a fifth collimation lens 1204, the second input port 1202 is located at a front focus of the fifth collimation lens 1204, and the fifth collimation lens 1204 is configured to collimate the second beam from the second input port 1202.

In this embodiment, a first lens component is further disposed between the fourth collimation lens 1203 and the fifth collimation lens 1204 and a second filter 303. A quantity of lenses included in the first lens component is not limited in this embodiment, provided that the first lens component can transmit a first beam from the fourth collimation lens 1203 and a second beam from the fifth collimation lens 1204 to the second filter 303. For a description of the second filter 303, refer to that shown in Embodiment 1. Details are not described again.

In this embodiment, an example description is provided by using an example in which the first lens component includes a fifth lens 1205 and a sixth lens 1206. It should be noted that the description of the first lens component in this embodiment is an optional example. For example, lenses included in the first lens component may be alternatively shown in Embodiment 1.

The following provides an example description of locations of the lenses (the fifth lens 1205 and the sixth lens 1206) included in the first lens component.

A rear focus of the fourth collimation lens 1203 is located on a front focus plane of the fifth lens 1205, and the front focus plane of the fifth lens 1205 is an XY plane that includes a front focus of the fifth lens 1205. A rear focus of the fifth collimation lens 1204 is also located on the front focus plane of the fifth lens 1205. That is, in the YZ plane, a distance between the fourth collimation lens 1203 and the fifth lens 1205 is equal to a sum of a focal length of the fourth collimation lens 1203 and a focal length of the fifth lens 1205, and a distance between the fifth collimation lens 1204 and the fifth lens 1205 is equal to a sum of a focal length of the fifth collimation lens 1204 and the focal length of the fifth lens 1205. By analogy, a rear focus of the fifth lens 1205 and a front focus of the sixth lens 1206 overlap. The second filter 303 is disposed between the sixth lens 1206 and a dispersion component (a first grating 308 and a second grating 309). For a description of the dispersion component, refer to that shown in Embodiment 1. Details are not described again.

A second lens component is disposed between the second filter 303 and a redirection component 301. A quantity of lenses included in the second lens component and functions of the lenses are not limited in this embodiment. For example, the second lens component shown in this embodiment includes a seventh lens 1207. The seventh lens 1207 is located between the second filter 303 and the redirection component 301. For a description of a location of the seventh lens 1207, refer to the description of the fifth lens 310 shown in the foregoing embodiment. Details are not described again.

In this embodiment, a first beam 1208 (shown by a solid line that is emergent from the fourth collimation lens 1203 and that is shown in FIG. 12) obtained after collimation is performed by using the fourth collimation lens 1203 is transmitted to the second filter 303 by sequentially passing through the fifth lens 1205 and the sixth lens 1206, and a second beam 1209 (shown by a dashed line that is emergent from the fifth collimation lens 1204 and that is shown in FIG. 12) obtained after collimation is performed by using the fifth collimation lens 1204 is transmitted to the second filter 303 by sequentially passing through the fifth lens 1205 and the sixth lens 1206. In this embodiment, an example description is provided by using an example in which the sixth lens 1206 transmits the first beam 1208 and the second beam 1209 to different locations of the second filter 303 along the YZ plane. A specific first location that is in the second filter 303 and to which the first beam 1208 is transmitted in the YZ plane and a specific second location that is in the second filter 303 and to which the second beam 1209 is transmitted in the YZ plane are not limited in this embodiment, provided that the first location and the second location are different locations in the second filter 303.

As shown in FIG. 12, the second filter 303 shown in this embodiment is configured to respectively change transmission directions of the first beam 1208 and the second beam 1209 based on bands to which the first beam 1208 and the second beam 1209 belong, and respectively transmit the first beam 1208 and the second beam 1209 to the first grating 308 and the second grating 309 at different locations. The second filter 303 is further configured to transmit a plurality of first sub-beams 1210 from the first grating 308 to the seventh lens 1207 in a reflected-light manner, and the second filter 303 is further configured to transmit a plurality of second sub-beams 1211 from the second grating 309 to the seventh lens 1207 in a pass-through-light manner. For a description of a process, refer to that shown in Embodiment 1. Details are not described again.

The seventh lens 1207 is configured to separately transmit the plurality of first sub-beams 1210 and the plurality of second sub-beams 1211 to a first filter 311 in directions parallel to an optical axis of the seventh lens 1207. As shown in FIG. 13, the first filter 311, a first reflector 312, and a second reflector 313 are jointly configured to enable flares of the plurality of first sub-beams 1210 to be generated in a first area 501 of the redirection component 301, and further configured to enable flares of the plurality of second sub-beams 1211 to be generated in a second area 502 of the redirection component 301. For a description of a process, refer to that shown in Embodiment 1. Details are not described again.

For a description of a process in which first sub-beams 1212 and second sub-beams 1213 that are obtained after redirection is performed by using the redirection component 301 are transmitted to an output port in this embodiment, refer to that shown in Embodiment 1. Details are not described again.

Because the first beam 1208 and the second beam 1209 that are shown in this embodiment are respectively input to the optical switching apparatus by using the independent first input port 1201 and second input port 1202, no filter that is coupled to the input ports and that is configured to perform multiplexing on the first beam 1208 and the second beam 1209 needs to be disposed in the optical switching apparatus shown in this embodiment. In comparison with Embodiment 1, it can be learned that, in Embodiment 1, because the first beam and the second beam need to be input to the optical switching apparatus by using the same input port, a filter coupled to the input port needs to be disposed, and the filter is configured to perform multiplexing on the first beam and the second beam that are transmitted by using two different optical fibers, so that the input port shown in Embodiment 1 can simultaneously input the first beam and the second beam to the optical switching apparatus. It can be learned that, in comparison with Embodiment 1, a quantity of optical components is reduced in Embodiment 2, thereby reducing an insertion loss.

Embodiment 3

In Embodiment 1 and Embodiment 2, at least partial area overlapping between the first area 501 and the second area 502 in the second direction Y is implemented by disposing the second filter 303, the first grating 308, and the second grating 309. In this embodiment, at least partial area overlapping between a first area 501 and a second area 502 in a second direction Y can be implemented without a need to dispose a second filter 303. Details are as follows.

Figure 14:
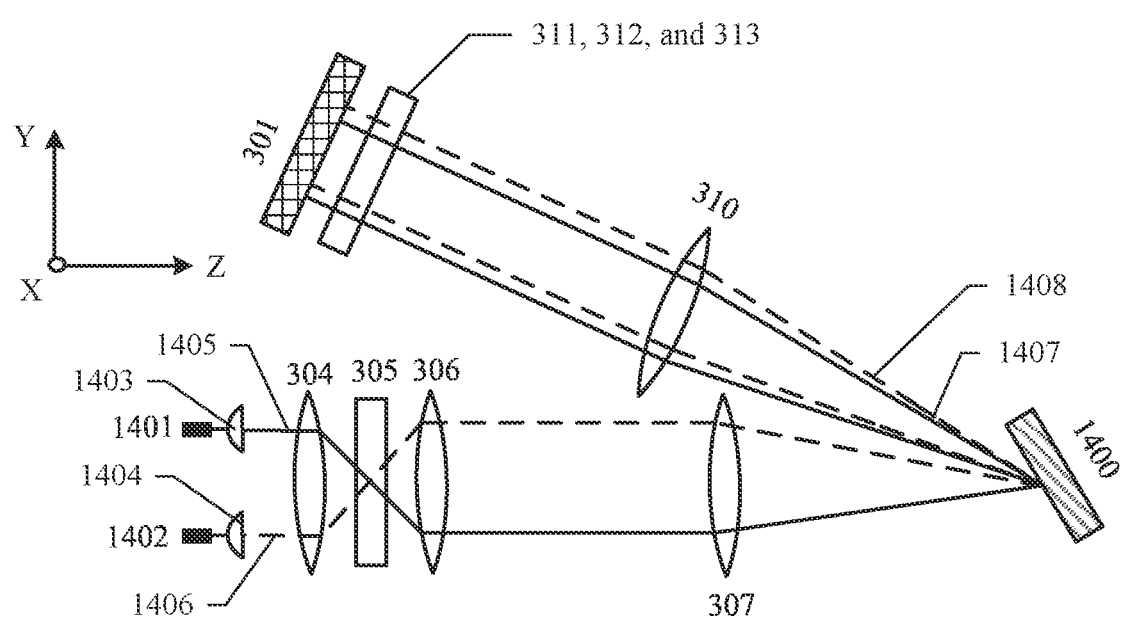
FIG. 14 is an example diagram of a third structure of an optical switching apparatus in a second direction according to this application.
Figure 15:
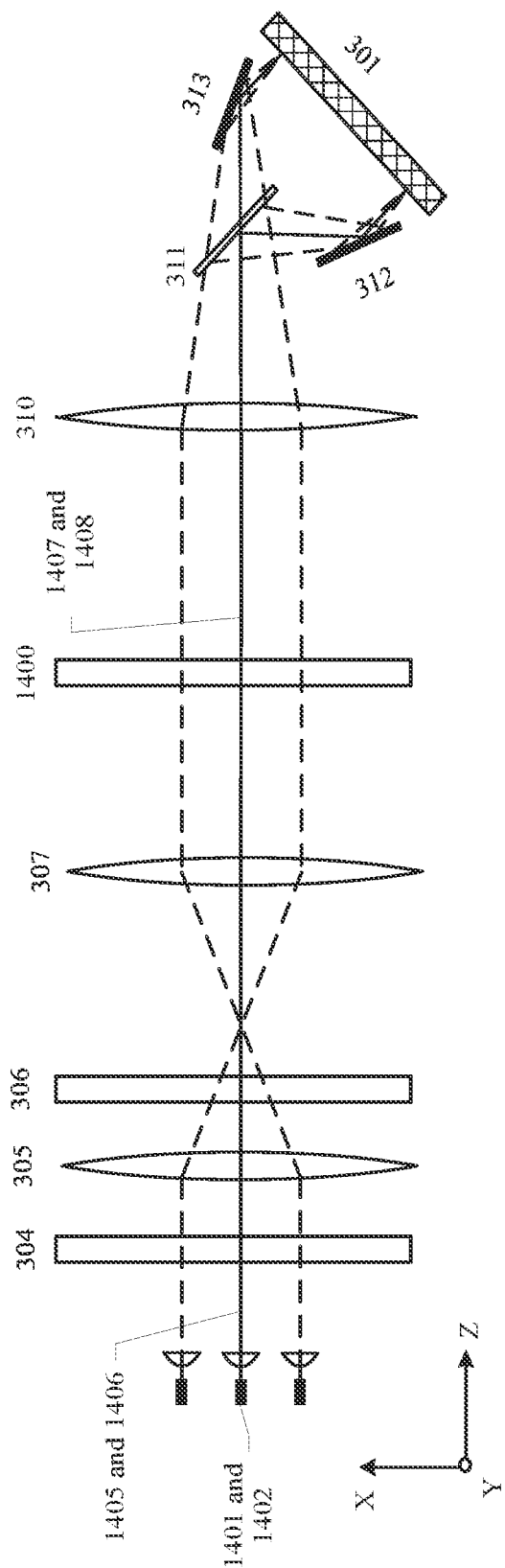
FIG. 15 is an example diagram of a third structure of an optical switching apparatus in a first direction according to this application.

As shown in FIG. 14 and FIG. 15, in comparison with Embodiment 1 and Embodiment 2, a dispersion component shown in this embodiment includes only one grating 1400. FIG. 14 is an example diagram of a structure of an optical switching apparatus in a second direction, and FIG. 15 is an example diagram of a structure of the optical switching apparatus in a first direction.

The optical switching apparatus shown in this embodiment includes a first input port 1401 and a second input port 1402. For descriptions of the first input port 1401 configured to input a first beam and the second input port 1402 configured to input a second beam, refer to those shown in Embodiment 2. Details are not described again.

Optionally, the first beam input by using the first input port 1401 is transmitted to a fourth collimation lens 1403, and the second beam input by using the second input port 1402 is transmitted to a fifth collimation lens 1404. For descriptions of the fourth collimation lens 1403 and the fifth collimation lens 1404, refer to those shown in Embodiment 2. Details are not described again.

The optical switching apparatus further includes a first lens component. In this embodiment, the first lens component includes a first lens 304, a second lens 305, a third lens 306, and a fourth lens 307. It should be noted that, an example in which the first lens component shown in Embodiment 3 includes same lenses as that shown in Embodiment 1 is used. A quantity of lenses included in the first lens component and functions of the lenses are not limited in this embodiment. In another example, the first lens component shown in Embodiment 3 may alternatively include same lenses as that shown in Embodiment 2.

For descriptions of locations and functions of the first lens 304, the second lens 305, and the third lens 306, refer to those shown in Embodiment 1. Details are not described again.

In comparison with Embodiment 1, a difference lies in that the grating 1400 shown in this embodiment is located at a location at which a rear focus of the fourth lens 307 intersects with a front focus of a fifth lens 310 included in a second lens component. For a description of the second lens component, refer to that shown in Embodiment 1. Details are not described again.

In this embodiment, a first beam 1405 input by using the first input port 1401 is transmitted to the grating 1400 by sequentially passing through the fourth collimation lens 1403, the first lens 304, the second lens 305, the third lens 306, and the fourth lens 307, and a second beam 1406 input by using the second input port 1402 is transmitted to the grating 1400 by sequentially passing through the fifth collimation lens 1404, the first lens 304, the second lens 305, the third lens 306, and the fourth lens 307. For a description of a transmission process, refer to that shown in Embodiment 1. Details are not described again.

In this embodiment, in a YZ plane, the fourth lens 307 is configured to transmit the first beam 1405 and the second beam 1406 to same or similar locations in the grating 1400. In this embodiment, in the YZ plane, only when the first beam 1405 and the second beam 1406 are transmitted to same or similar locations in the grating 1400, at least partial area overlapping between first flares and second flares in the second direction Y can be effectively ensured. For descriptions of the first flares and the second flares, refer to those shown in Embodiment 1. Details are not described again.

In this embodiment, diffraction efficiency of the first beam 1405 may be improved by adjusting a value of a first incident angle. The first incident angle is an angle at which the first beam 1405 is incident onto the grating 1400 in the YZ plane. Diffraction efficiency of the second beam 1406 may be further improved by adjusting a value of a second incident angle. The second incident angle is an angle at which the second beam 1406 is incident onto the grating 1400 in the YZ plane. The following describes the values of the first incident angle and the second incident angle.

The values of the first incident angle and the second incident angle that are shown in this embodiment are not equal, that is, a difference between an absolute value of the first incident angle and an absolute value of the second incident angle is not zero. A difference between the first incident angle and a first blaze angle is less than or equal to a first preset value. A specific first preset value is not limited in this embodiment, provided that the first incident angle is equal to or approximately equal to the first blaze angle. In this embodiment, an example description is provided by using an example in which the first preset value is 5.

The first blaze angle corresponds to a band to which the first beam belongs. It can be learned that, in this embodiment, provided that the band to which the first beam 1405 belongs is specified, the blaze angle corresponding to the band can be determined. In this embodiment, for example, a blaze angle corresponding to a beam belonging to a C band is the first blaze angle. When the first beam 1405 is incident onto the grating 1400 at the first blaze angle or at an angle (the first incident angle) approximately equal to the first blaze angle, the grating 1400 has relatively good diffraction efficiency. It can be learned that, when the first beam 1405 is incident onto the grating 1400 at the first incident angle, efficiency of diffracting the first beam 1405 from the grating 1400 can be effectively improved.

A difference between the second incident angle and a second blaze angle that are shown in this embodiment is less than or equal to the foregoing first preset value. The second blaze angle corresponds to a band to which the second beam 1406 belongs. It can be learned that, in this embodiment, provided that a band L to which the second beam 1406 belongs is specified, a blaze angle corresponding to the band L can be determined. Further, when the second beam 1406 is incident onto the grating 1400 at the second blaze angle or at an angle (the second incident angle) approximately equal to the second blaze angle, the grating 1400 has relatively good diffraction efficiency. It can be learned that, when the second beam 1406 is incident onto the grating 1400 at the second incident angle, efficiency of diffracting the second beam 1406 from the grating 1400 can be effectively improved.

To ensure that the first beam 1405 is incident onto the grating 1400 at the first incident angle and the second beam 1406 is incident onto the grating 1400 at the second incident angle, the values of the first incident angle and the second incident angle may be adjusted in the following manner, so that the first incident angle is equal to or approximately equal to the first blaze angle, and the second incident angle is equal to or approximately equal to the second blaze angle.

In terms of the first incident angle, the value of the first incident angle may be adjusted by adjusting a distance between the first input port 1401 and an optical axis of the lenses (304, 305, and 306) located between the input port and the grating 1400 in the YZ plane, until the difference between the first incident angle and the first blaze angle is less than or equal to the first preset value. For a description of an adjustment manner of the second incident angle, refer to that of the adjustment manner of the first incident angle. Details are not described.

The grating 1400 shown in this embodiment is configured to decompose the first beam 1405 into a plurality of first sub-beams 1407 (each shown by a solid line that is emergent from the grating 1400 and that is shown in FIG. 14), and the grating 1400 is further configured to decompose the second beam 1406 into a plurality of second sub-beams 1408 (each shown by a dashed line that is emergent from the grating 1400 and that is shown in FIG. 14). For descriptions of the first sub-beams 1407 and the second sub-beams 1408, refer to those shown in Embodiment 1. Details are not described again.

The grating 1400 is configured to transmit the plurality of first sub-beams 1407 and the plurality of second sub-beams 1408 to a first filter 311 by using the fifth lens 310. The first filter 311, a first reflector 312, and a second reflector 313 are jointly configured to enable flares of the plurality of first sub-beams 1407 to be generated in a first area 501 of a redirection component 301, and further configured to enable flares of the plurality of second sub-beams 1408 to be generated in a second area 502 of the redirection component 301. For a description of a process, refer to that shown in Embodiment 1. Details are not described again.

A plurality of first sub-beams and a plurality of second sub-beams that are emergent from the first filter 311 are transmitted to the grating 1400. The grating 1400 is configured to combine the plurality of first sub-beams into a second beam, and the grating 1400 is further configured to combine the plurality of second sub-beams into a third beam. For a description of a process in which the second beam and the third beam are output by using an output port, refer to that shown in Embodiment 1. Details are not described again.

According to the optical switching apparatus shown in this embodiment, one grating 1400 is shown in this embodiment. In comparison with the structure of the two gratings and the second filter in Embodiment 1 and Embodiment 2, a quantity of optical components is reduced, thereby reducing an insertion loss in a process of deflecting transmission directions of the first beam and the second beam.

Embodiment 4

In Embodiment 1 to Embodiment 3, when the first beam and the second beam are input to the optical switching apparatus, the first beam and the second beam are first adjusted in the second direction, that is, the first beam and the second beam are adjusted in the second direction, so that the first flares generated by the first beam on the redirection component and the second flares generated by the second beam on the redirection component overlap or partially overlap in the second direction Y For descriptions, refer to those shown in Embodiment 1 to Embodiment 3. After the adjustment on the first beam and the second beam in the second direction is completed, adjustment in the first direction is performed, so that the locations of the first flares and the second flares are separated in the first direction X.

In this embodiment, a first beam and a second beam are first adjusted in a first direction X, and then the first beam and the second beam are adjusted in a second direction Y. An example process is as follows.

Figure 16:
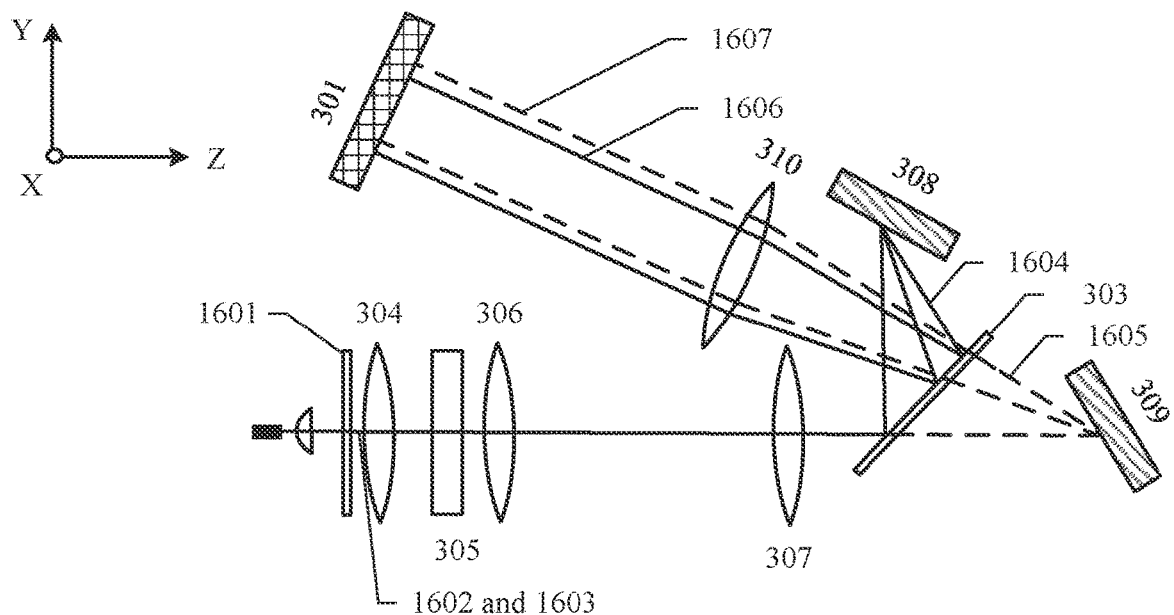
FIG. 16 is an example diagram of a fourth structure of an optical switching apparatus in a second direction according to this application.
Figure 17:
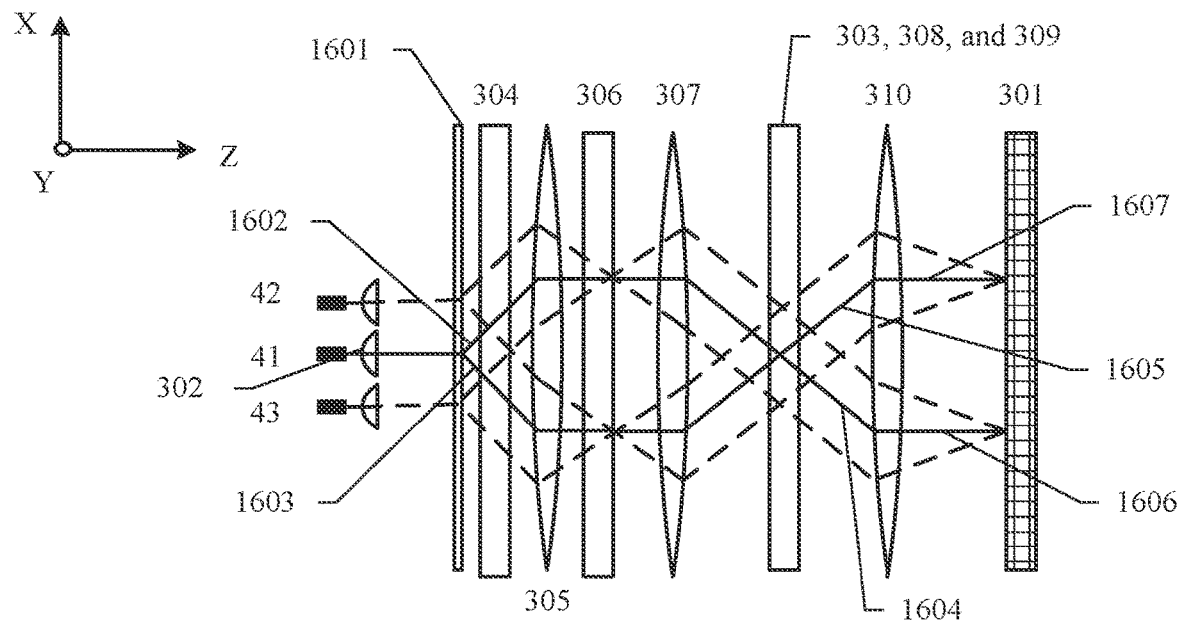
FIG. 17 is an example diagram of a fourth structure of an optical switching apparatus in a first direction according to this application.

In this embodiment, refer to FIG. 16 and FIG. 17. FIG. 16 is an example diagram of a structure of an optical switching apparatus in a second direction, and FIG. 17 is an example diagram of a structure of the optical switching apparatus in a first direction.

In this embodiment, the optical switching apparatus includes an input port 41 configured to input the first beam and the second beam. For descriptions of the first beam, the second beam, and the input port 41, refer to those shown in Embodiment 1. Details are not described again. It should be noted that, in this embodiment, an example description is provided by using an example in which the first beam and the second beam are input to the optical switching apparatus by using the same input port 41. In another example, the first beam and the second beam may be alternatively input to the optical switching apparatus by using different input ports, as shown in Embodiment 2. Details are not described again.

Optionally, the optical switching apparatus further includes a first collimation lens 302 coupled to the input port 41. For a description of the first collimation lens 302, refer to that shown in Embodiment 1. Details are not described again.

A first beam and a second beam that are obtained after collimation is performed by using the first collimation lens 302 are transmitted to a third filter 1601. That is, the optical switching apparatus shown in this embodiment further includes the third filter 1601, and the third filter 1601 is located at a rear focus of the first collimation lens 302, that is, in an XZ plane, a distance between the first collimation lens 302 and the third filter 1601 is equal to a focal length of the collimation lens 302. The third filter 1601 shown in this embodiment may be a thin film filter. For a description of the thin film filter, refer to that shown in Embodiment 1. Details are not described again.

Further, after receiving the first beam and the second beam, the third filter 1601 shown in this embodiment may separate transmission directions of the first beam and the second beam into different transmission directions in the first direction based on a band to which the first beam belongs and a band to which the second beam belongs. Further, the separation between the transmission directions of the first beam and the second beam in the first direction in this embodiment further indicates that the transmission directions of the first beam and the second beam are separated into different transmission directions in the XZ plane.

As shown in FIG. 17, when the third filter 1601 is a thin film filter, it can be learned from the description of the principle of the thin film filter in Embodiment 1, the third filter 1601 can transmit a first beam 1602 and a second beam 1603 in different transmission manners, to implement separation between transmission directions in the XZ plane.

The optical switching apparatus shown in this embodiment further includes a first lens component. The first lens component shown in this embodiment includes a first lens 304, a second lens 305, a third lens 306, and a fourth lens 307. For a description of the first lens component, refer to that shown in Embodiment 1. Details are not described again. The third filter 1601 shown in this embodiment is located at a front focus of the second lens 305.

The fourth lens 307 is configured to transmit the first beam 1602 and the second beam 1603 to a second filter 303. The second filter 303 is configured to respectively change transmission directions of the first beam 1602 and the second beam 1603 based on bands to which the first beam 1602 and the second beam 1603 belong, and respectively transmit the first beam 1602 and the second beam 1603 to a first grating 308 and a second grating 309 at different locations. The second filter 303 is further configured to transmit a plurality of first sub-beams 1604 (each shown by a solid line emergent from the first grating 308) from the first grating 308 to a fifth lens 310 in a reflected-light manner, and the second filter 303 is further configured to transmit a plurality of second sub-beams 1605 (each shown by a dashed line emergent from the second grating 309) from the second grating 309 to the fifth lens 310 in a pass-through-light manner. For descriptions of a process and the fifth lens 310, refer to those shown in Embodiment 1. Details are not described again.

The fifth lens 310 is configured to separately transmit a plurality of first sub-beams 1606 (each shown by a solid line emergent from the fifth lens 310) and a plurality of second sub-beams 1607 (each shown by a dashed line emergent from the fifth lens 310) to a redirection component 301 in directions parallel to an optical axis of the fifth lens 310. Flares of the plurality of first sub-beams 1606 are generated in a first area 501 of the redirection component 301, and flares of the plurality of second sub-beams 1607 are generated in a second area 502 of the redirection component 301. For a description of a process, refer to that shown in Embodiment 1. Details are not described again.

For a description of a process in which redirected first sub-beams and second sub-beams that are emergent from the redirection component 301 are transmitted to an output port in this embodiment, refer to that shown in Embodiment 1. Details are not described again.

For descriptions of beneficial effects in this embodiment, refer to those shown in Embodiment 1. Details are not described again.

Embodiment 5

In Embodiment 4, at least partial area overlapping between the first flares and the second flares in the second direction Y is implemented by disposing the second filter 303, the first grating 308, and the second grating 309. In this embodiment, at least partial area overlapping between first flares and second flares in a second direction Y can be implemented without a need to dispose a second filter 303. Details are as follows.

Figure 18:
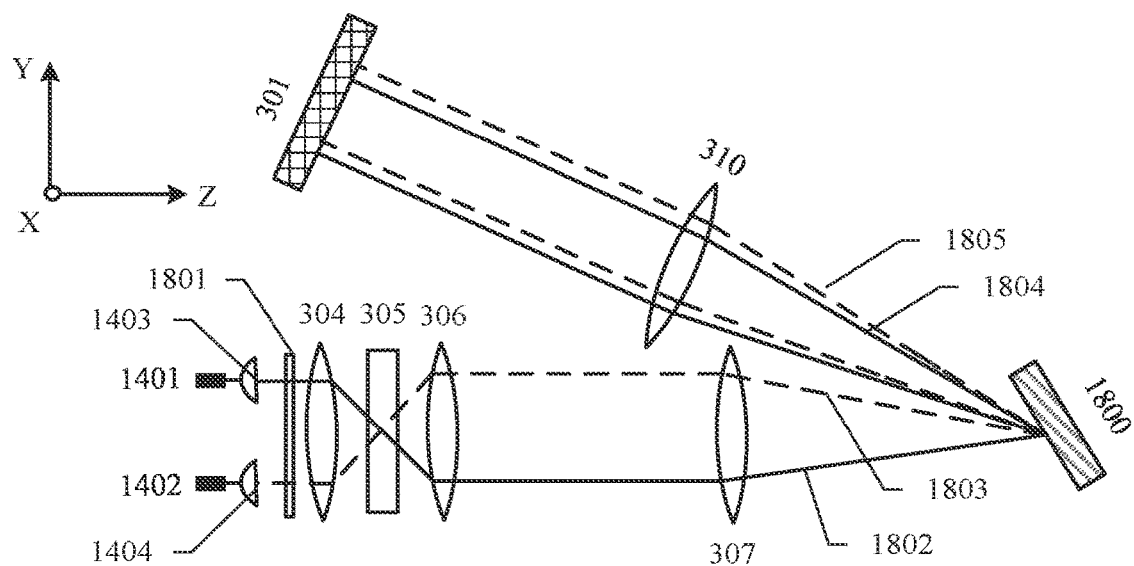
FIG. 18 is an example diagram of a fifth structure of an optical switching apparatus in a second direction according to this application.
Figure 19:
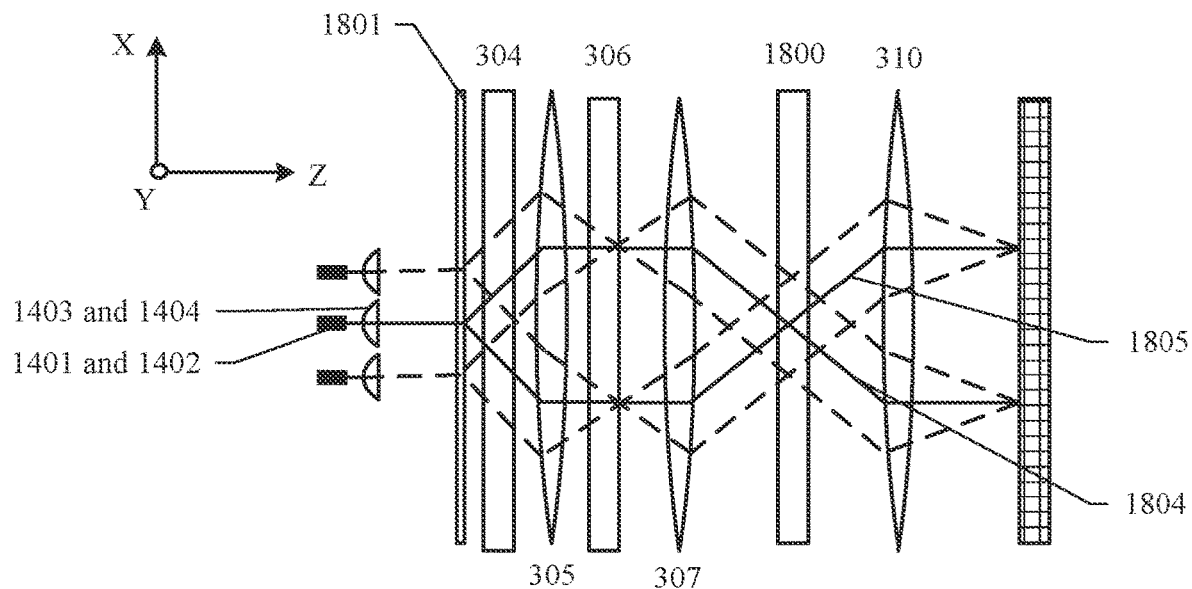
FIG. 19 is an example diagram of a fifth structure of an optical switching apparatus in a first direction according to this application.

FIG. 18 is an example diagram of a structure of an optical switching apparatus in a second direction, and FIG. 19 is an example diagram of a structure of the optical switching apparatus in a first direction. In comparison with Embodiment 4, a dispersion component shown in this embodiment includes only one grating 1800.

The optical switching apparatus shown in this embodiment includes a first input port 1401 and a second input port 1402. For descriptions of the first input port 1401 configured to input a first beam and the second input port 1402 configured to input a second beam, refer to those shown in Embodiment 3. Details are not described again.

Optionally, the first beam input by using the first input port 1401 is transmitted to a fourth collimation lens 1403, and the second beam input by using the second input port 1402 is transmitted to a fifth collimation lens 1404. For descriptions of the fourth collimation lens 1403 and the fifth collimation lens 1404, refer to those shown in Embodiment 3. Details are not described again.

The optical switching apparatus shown in this embodiment further includes a third filter 1801. The third filter 1801 is located on rear focal planes of the fourth collimation lens 1403 and the fifth collimation lens 1404. The third filter 1801 is configured to separate transmission directions of the first beam and the second beam into different transmission directions in the first direction based on a band to which the first beam belongs and a band to which the second beam belongs. For a description, refer to that shown in Embodiment 4. Details are not described again.

The optical switching apparatus shown in this embodiment further includes a first lens component. The first lens component shown in this embodiment includes a first lens 304, a second lens 305, a third lens 306, and a fourth lens 307. For a description of the first lens component, refer to that shown in Embodiment 1. Details are not described again. The grating 1800 shown in this embodiment is located in a location at which a rear focus of the fourth lens 307 intersects with a front focus of a fifth lens 310. For descriptions of the grating 1800 and the fifth lens 310, refer to those shown in Embodiment 4. Details are not described again.

It can be learned that in this embodiment, a first beam 1802 (a solid line that is transmitted by the first input port 1401 to the grating 1800 and that is shown in FIG. 18) input by the first input port 1401 is transmitted to the grating 1800 by sequentially passing through the fourth collimation lens 1403, the third filter 1801, the first lens 304, the second lens 305, the third lens 306, and the fourth lens 307, and a second beam 1803 (a dashed line that is transmitted by the second input port 1402 to the grating 1800 and that is shown in FIG. 18) input by the second input port 1402 is transmitted to the grating 1800 after sequentially passing through the fifth collimation lens 1404, the third filter 1801, the first lens 304, the second lens 305, the third lens 306, and the fourth lens 307. For a description of a transmission process, refer to that shown in Embodiment 3. Details are not described again.

In this embodiment, in a YZ plane, the fourth lens 307 is configured to transmit the first beam 1802 and the second beam 1803 to same or similar locations in the grating 1800, and in the YZ plane, the first beam 1802 is incident onto the grating 1800 at a first incident angle, and the second beam 1803 is incident onto the grating 1800 at a second incident angle. For descriptions of the first incident angle and the second incident angle, refer to those shown in Embodiment 3. Details are not described again.

The grating 1800 shown in this embodiment is configured to decompose the first beam 1802 into a plurality of first sub-beams 1804 (each shown by a solid line that is emergent from the grating 1800 and that is shown in FIG. 18), and the grating 1800 is further configured to decompose the second beam 1803 into a plurality of second sub-beams 1805 (each shown by a dashed line that is emergent from the grating 1800 and that is shown in FIG. 18). For descriptions of the first sub-beams 1804 and the second sub-beams 1805, refer to those shown in Embodiment 3. Details are not described again.

The grating 1800 is configured to transmit the plurality of first sub-beams 1804 and the plurality of second sub-beams 1805 to a redirection component 301 by using the fifth lens 310. Flares of the plurality of first sub-beams 1804 are generated in a first area 501 of the redirection component 301, and flares of the plurality of second sub-beams 1805 are generated in a second area 502 of the redirection component 301. For a description of a process, refer to that shown in Embodiment 4. Details are not described again.

For a description of a process in which redirected first sub-beams and second sub-beams that are emergent from the redirection component 301 are transmitted to an output port in this embodiment, refer to that shown in Embodiment 4. Details are not described again.

Embodiment 6

Figure 20A:
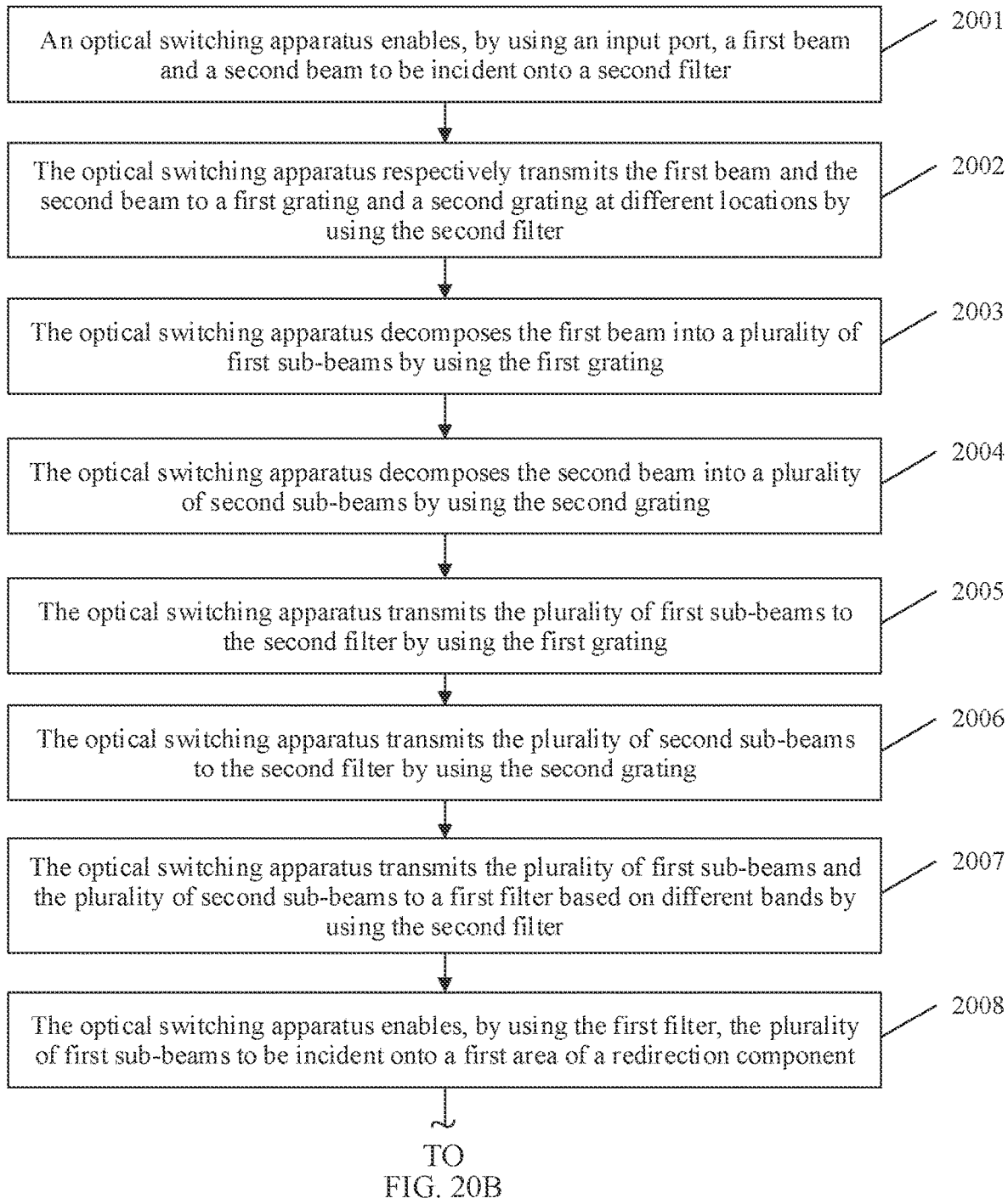
FIG. 20A and FIG. 20B are a flowchart of steps in a first embodiment of a redirection method according to this application.
Figure 20B:
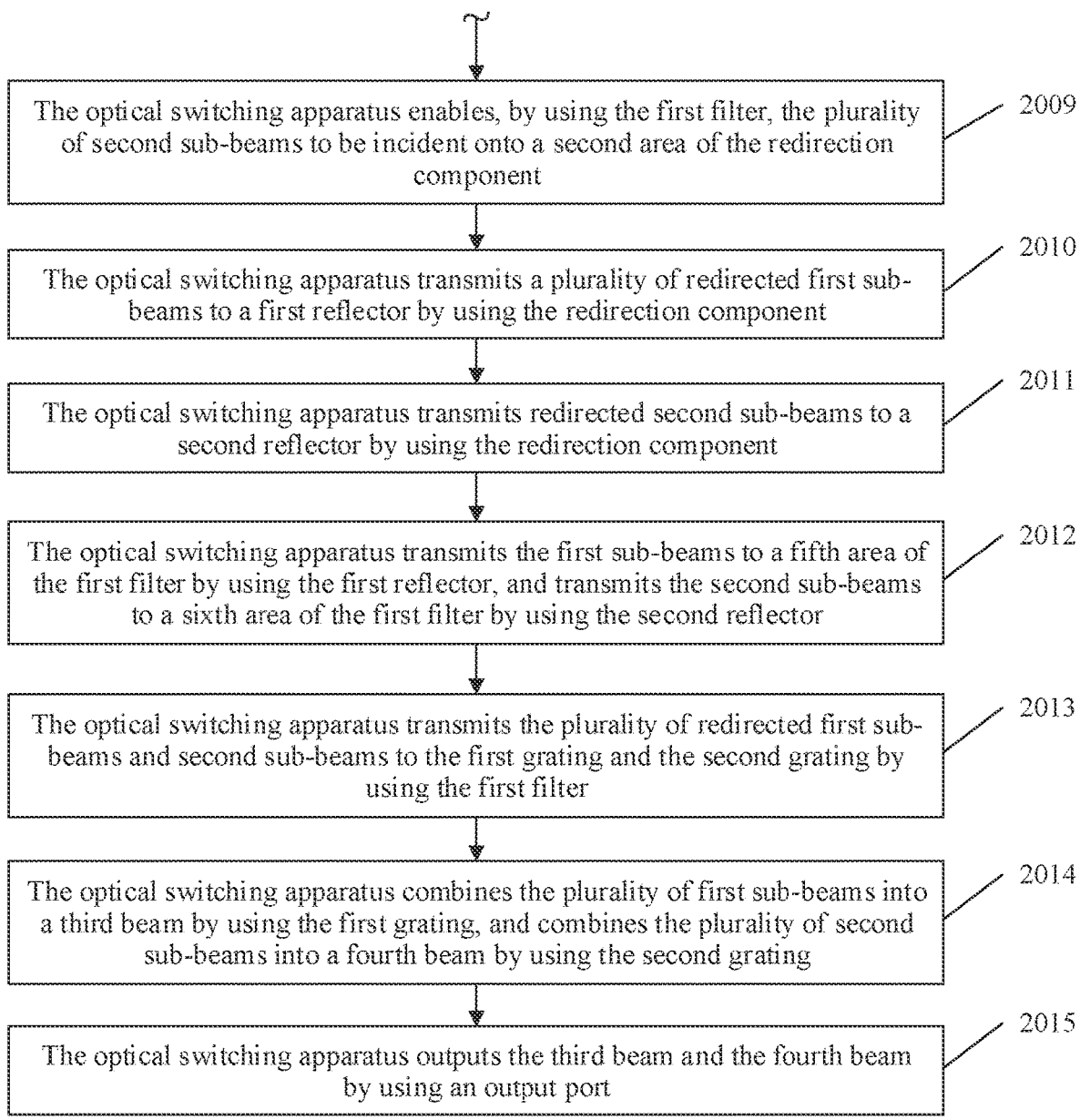

This embodiment provides a redirection method. The redirection method shown in this embodiment is based on the optical switching apparatus shown in Embodiment 1 or Embodiment 2. For a structure of the optical switching apparatus, refer to that shown in Embodiment 1 or Embodiment 2. Details are not described again. The following provides, with reference to FIG. 20A and FIG. 20B, an example description of an execution process of the redirection method shown in this embodiment. FIG. 20A and FIG. 20B are a flowchart of steps in a first embodiment of a redirection method according to this application.

Step 2001: An optical switching apparatus enables, by using an input port, a first beam and a second beam to be incident onto a second filter.

In this embodiment, the optical switching apparatus may input the first beam and the second beam to the optical switching apparatus by using a same input port, as shown in Embodiment 1. Further, optionally, the optical switching apparatus may input the first beam to the optical switching apparatus by using a first input port, and may further input the second beam to the optical switching apparatus by using a second input port, as shown in Embodiment 2.

Step 2002: The optical switching apparatus respectively transmits the first beam and the second beam to a first grating and a second grating at different locations by using the second filter.

Further, the optical switching apparatus respectively changes, by using the second filter, transmission directions of the first beam and the second beam based on bands to which the first beam and the second beam belong, so that the first beam is transmitted to the first grating and the second beam is transmitted to the second grating.

Step 2003: The optical switching apparatus decomposes the first beam into a plurality of first sub-beams by using the first grating.

Step 2004: The optical switching apparatus decomposes the second beam into a plurality of second sub-beams by using the second grating.

Step 2005: The optical switching apparatus transmits the plurality of first sub-beams to the second filter by using the first grating.

Step 2006: The optical switching apparatus transmits the plurality of second sub-beams to the second filter by using the second grating.

Step 2007: The optical switching apparatus transmits the plurality of first sub-beams and the plurality of second sub-beams to a first filter based on the different bands by using the second filter.

Step 2008: The optical switching apparatus enables, by using the first filter, the plurality of first sub-beams to be incident onto a first area of a redirection component.

Step 2009: The optical switching apparatus enables, by using the first filter, the plurality of second sub-beams to be incident onto a second area of the redirection component.

Further, the optical switching apparatus separates, by using the first filter, transmission directions of the plurality of first sub-beams and the plurality of second sub-beams into different transmission directions in a first direction based on the different bands, so that the plurality of first sub-beams are incident onto the first area of the redirection component, and the plurality of second sub-beams are incident onto the second area of the redirection component.

More further, the optical switching apparatus transmits the plurality of first sub-beams to a first reflector by using the first filter, and transmits the plurality of second sub-beams to a second reflector by using the first filter, so that the optical switching apparatus can transmit the plurality of first sub-beams to the first area of the redirection component by using the first reflector, and transmit the plurality of second sub-beams to the second area of the redirection component by using the second reflector.

Step 2010: The optical switching apparatus transmits a plurality of redirected first sub-beams to the first reflector by using the redirection component.

Step 2011: The optical switching apparatus transmits redirected second sub-beams to the second reflector by using the redirection component.

Step 2012: The optical switching apparatus transmits the first sub-beams to a fifth area of the first filter by using the first reflector, and transmits the second sub-beams to a sixth area of the first filter by using the second reflector.

Optionally, if the first sub-beams and the second sub-beams need to be output by using a same output port, the fifth area and the sixth area overlap or partially overlap. Further, optionally, if the first sub-beams and the second sub-beams need to be output by using different output ports, locations of the fifth area and the sixth area are separated.

Step 2013: The optical switching apparatus transmits the plurality of redirected first sub-beams and second sub-beams to the first grating and the second grating by using the first filter.

Step 2014: The optical switching apparatus combines the plurality of first sub-beams into a third beam by using the first grating, and combines the plurality of second sub-beams into a fourth beam by using the second grating.

Step 2015: The optical switching apparatus outputs the third beam and the fourth beam by using an output port.

For descriptions of beneficial effects shown in this embodiment, refer to those shown in Embodiment 1 or Embodiment 2. Details are not described again in this embodiment.

Embodiment 7

Figure 21A:
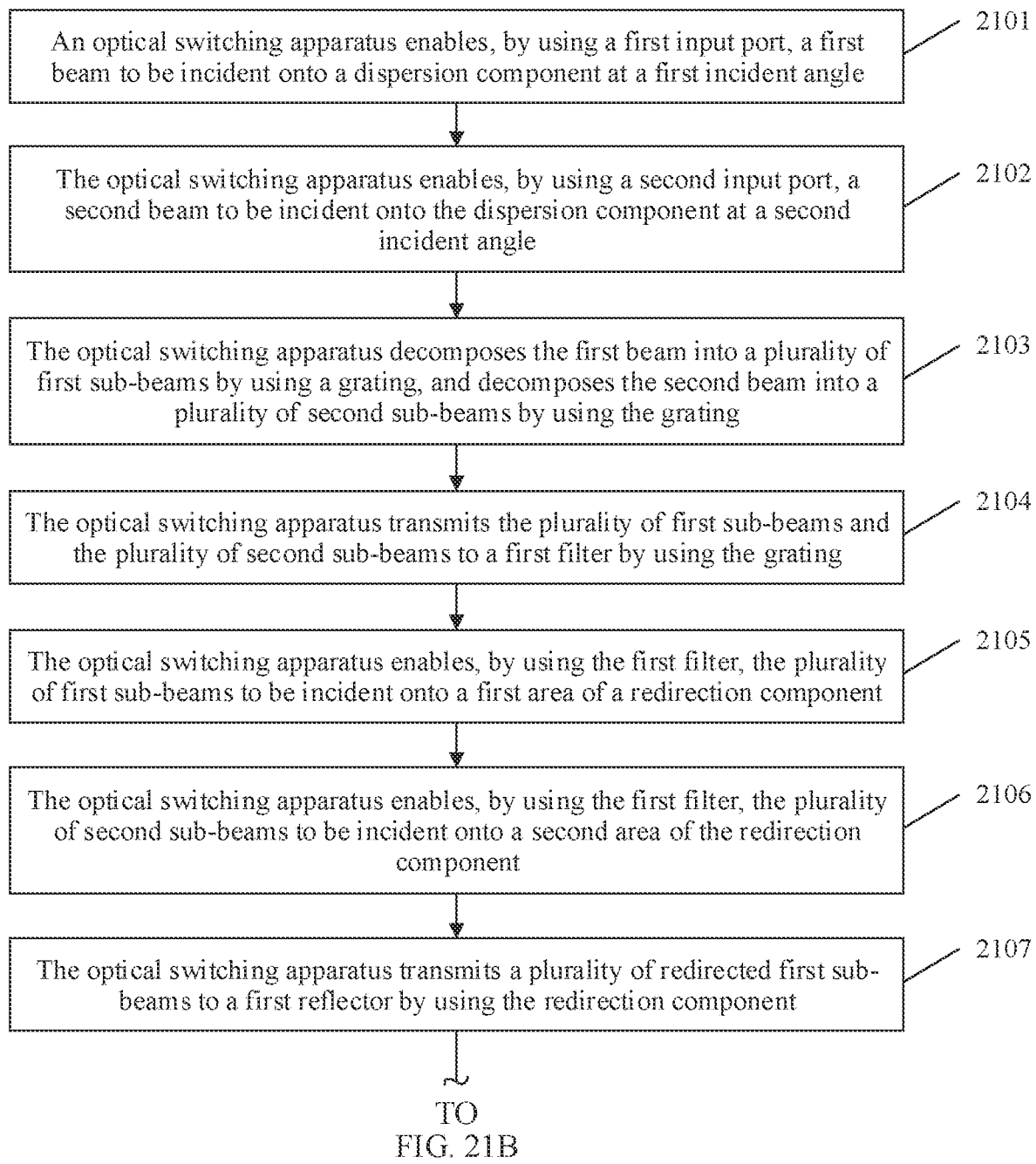

This embodiment provides a redirection method. The redirection method shown in this embodiment is based on the optical switching apparatus shown in Embodiment 3. For a structure of the optical switching apparatus, refer to that shown in Embodiment 3. Details are not described again. The following provides, with reference to FIG. 21A and FIG. 21B, an example description of an execution process of the redirection method shown in this embodiment. FIG. 21A and FIG. 21B are a flowchart of steps in a second embodiment of a redirection method according to this application.

Step 2101: An optical switching apparatus enables, by using a first input port, a first beam to be incident onto a dispersion component at a first incident angle.

Step 2102: The optical switching apparatus enables, by using a second input port, a second beam to be incident onto the dispersion component at a second incident angle.

A difference between an absolute value of the first incident angle and an absolute value of the second incident angle is not zero, a difference between the first incident angle and a first blaze angle is less than or equal to a first preset value, a difference between the second incident angle and a second blaze angle is less than or equal to a second preset value, the first blaze angle corresponds to a band to which the first beam belongs, and the second blaze angle corresponds to a band to which the second beam belongs. For descriptions of the first incident angle and the second incident angle, refer to those shown in Embodiment 3. Details are not described again.

Further, the optical switching apparatus transmits the first beam and the second beam to the dispersion component by using a first lens component. In a second direction, a value of a distance between the first input port and an optical axis of the lens component is related to a value of the first incident angle, and a value of a distance between the second input port and the optical axis of the lens component is related to a value of the second incident angle.

Step 2103: The optical switching apparatus decomposes the first beam into a plurality of first sub-beams by using a grating, and decomposes the second beam into a plurality of second sub-beams by using the grating.

Step 2104: The optical switching apparatus transmits the plurality of first sub-beams and the plurality of second sub-beams to a first filter by using the grating.

Step 2105: The optical switching apparatus enables, by using the first filter, the plurality of first sub-beams to be incident onto a first area of a redirection component.

Step 2106: The optical switching apparatus enables, by using the first filter, the plurality of second sub-beams to be incident onto a second area of the redirection component.

Step 2107: The optical switching apparatus transmits a plurality of redirected first sub-beams to a first reflector by using the redirection component.

Step 2108: The optical switching apparatus transmits redirected second sub-beams to a second reflector by using the redirection component.

Step 2109: The optical switching apparatus transmits the first sub-beams to a fifth area of the first filter by using the first reflector, and transmits the second sub-beams to a sixth area of the first filter by using the second reflector.

For execution processes of step 2105 to step 2109 shown in this embodiment, refer to step 2008 to step 2012 shown in Embodiment 6. Details are not described again.

Step 2110: The optical switching apparatus transmits the plurality of redirected first sub-beams and second sub-beams to the grating by using the first filter.

Step 2111: The optical switching apparatus combines the plurality of first sub-beams into a third beam by using the grating, and combines the plurality of second sub-beams into a fourth beam by using the grating.

Step 2112: The optical switching apparatus outputs the third beam and the fourth beam by using an output port.

For descriptions of beneficial effects shown in this embodiment, refer to those shown in Embodiment 3. Details are not described again.

Embodiment 8

Figure 22B:
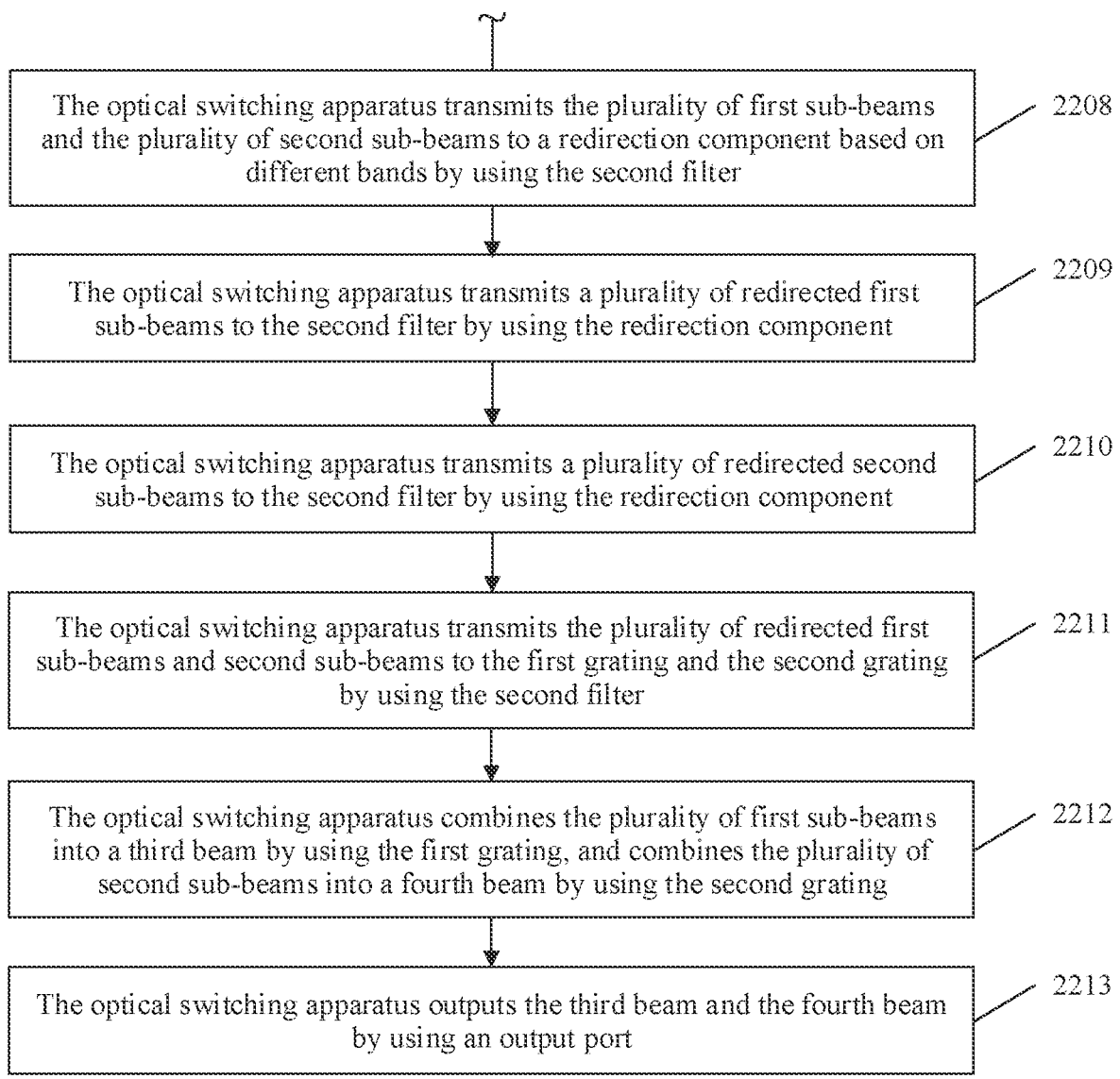

This embodiment provides a redirection method. The redirection method shown in this embodiment is based on the optical switching apparatus shown in Embodiment 4. For a structure of the optical switching apparatus, refer to that shown in Embodiment 4. Details are not described again. The following provides, with reference to FIG. 22A and FIG. 22B, an example description of an execution process of the redirection method shown in this embodiment. FIG. 22A and FIG. 22B are a flowchart of steps in a third embodiment of a redirection method according to this application.

Step 2201: An optical switching apparatus enables, by using an input port, a first beam and a second beam to be incident onto a third filter.

The first beam and the second beam belong to different bands. For a description, refer to that shown in Embodiment 4. Details are not described again.

Step 2202: The optical switching apparatus transmits the first beam and the second beam to a second filter by using the third filter.

Further, the optical switching apparatus separates transmission directions of the first beam and the second beam into different transmission directions in a first direction based on the different bands by using the third filter, so that the first beam and the second beam are transmitted to the second filter.

Step 2203: The optical switching apparatus respectively transmits the first beam and the second beam to a first grating and a second grating at different locations by using the second filter.

Further, the optical switching apparatus respectively changes transmission directions of the first beam and the second beam based on the different bands by using the second filter, so that the first beam is transmitted to the first grating and the second beam is transmitted to the second grating.

Step 2204: The optical switching apparatus decomposes the first beam into a plurality of first sub-beams by using the first grating.

Step 2205: The optical switching apparatus decomposes the second beam into a plurality of second sub-beams by using the second grating.

Step 2206: The optical switching apparatus transmits the plurality of first sub-beams to the second filter by using the first grating.

Step 2207: The optical switching apparatus transmits the plurality of second sub-beams to the second filter by using the second grating.

For execution processes of step 2204 to step 2207 shown in this embodiment, refer to step 2003 to step 2006 shown in FIG. 20A and FIG. 20B. Details are not described again.

Step 2208: The optical switching apparatus transmits the plurality of first sub-beams and the plurality of second sub-beams to a redirection component based on the different bands by using the second filter.

Step 2209: The optical switching apparatus transmits a plurality of redirected first sub-beams to the second filter by using the redirection component.

Step 2210: The optical switching apparatus transmits a plurality of redirected second sub-beams to the second filter by using the redirection component.

Step 2211: The optical switching apparatus transmits the plurality of redirected first sub-beams and second sub-beams to the first grating and the second grating by using the second filter.

Step 2212: The optical switching apparatus combines the plurality of first sub-beams into a third beam by using the first grating, and combines the plurality of second sub-beams into a fourth beam by using the second grating.

Step 2213: The optical switching apparatus outputs the third beam and the fourth beam by using an output port.

For descriptions of beneficial effects shown in this embodiment, refer to those shown in Embodiment 4. Details are not described again.

Embodiment 9

Figure 23:
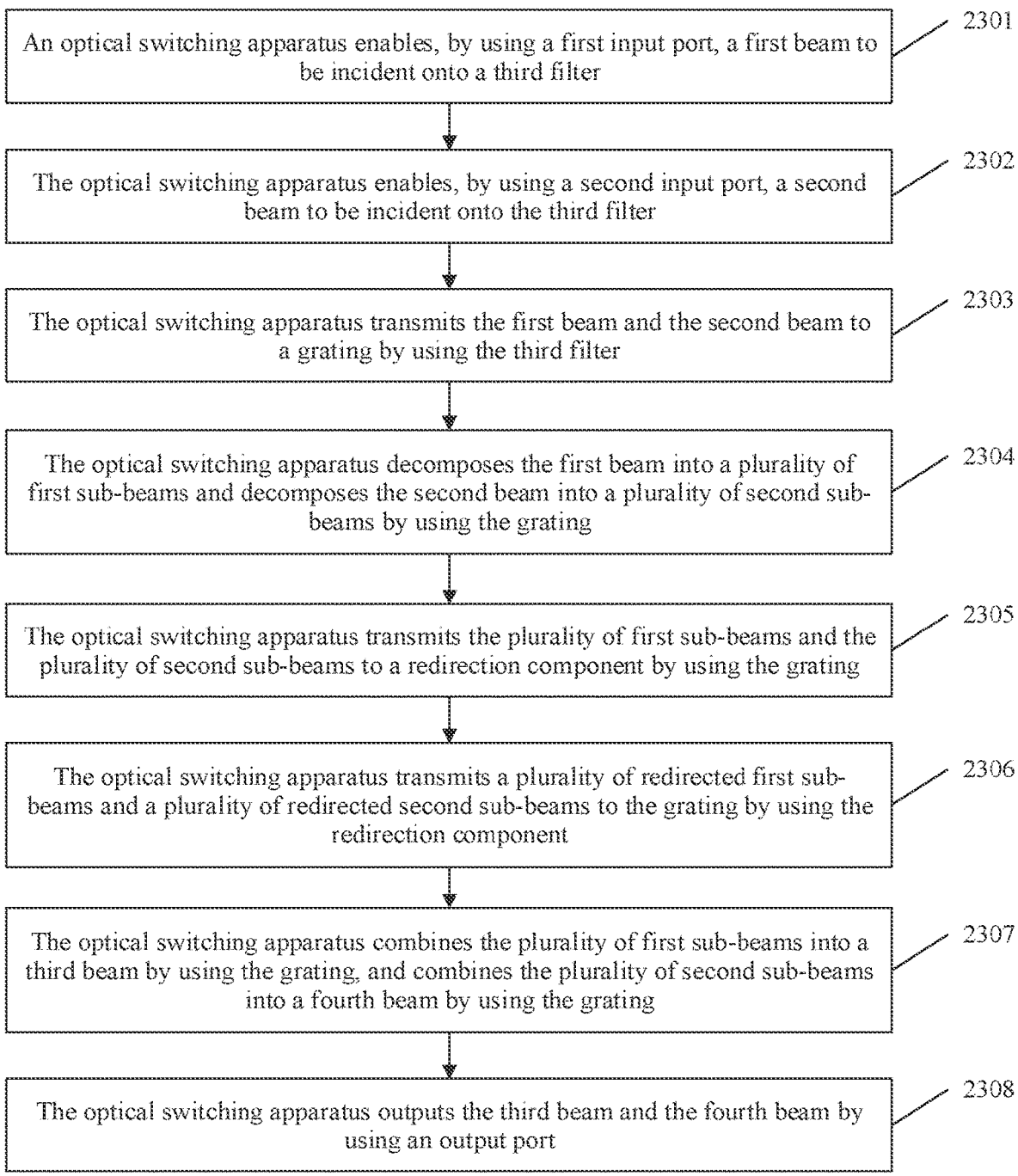
FIG. 23 is a flowchart of steps in a fourth embodiment of a redirection method according to this application.

This embodiment provides a redirection method. The redirection method shown in this embodiment is based on the optical switching apparatus shown in Embodiment 5. For a structure of the optical switching apparatus, refer to that shown in Embodiment 5. Details are not described again. The following provides, with reference to FIG. 23, an example description of an execution process of the redirection method shown in this embodiment. FIG. 23 is a flowchart of steps in a fourth embodiment of a redirection method according to this application.

Step 2301: An optical switching apparatus enables, by using a first input port, a first beam to be incident onto a third filter.

Step 2302: The optical switching apparatus enables, by using a second input port, a second beam to be incident onto the third filter.

Step 2303: The optical switching apparatus transmits the first beam and the second beam to a grating by using the third filter.

Step 2304: The optical switching apparatus decomposes the first beam into a plurality of first sub-beams and decomposes the second beam into a plurality of second sub-beams by using the grating.

Step 2305: The optical switching apparatus transmits the plurality of first sub-beams and the plurality of second sub-beams to a redirection component by using the grating.

Step 2306: The optical switching apparatus transmits a plurality of redirected first sub-beams and a plurality of redirected second sub-beams to the grating by using the redirection component.

Step 2307: The optical switching apparatus combines the plurality of first sub-beams into a third beam by using the grating, and combines the plurality of second sub-beams into a fourth beam by using the grating.

Step 2308: The optical switching apparatus outputs the third beam and the fourth beam by using an output port.

For descriptions of beneficial effects shown in this embodiment, refer to those shown in Embodiment 5. Details are not described again.

Embodiment 10

Figure 24:
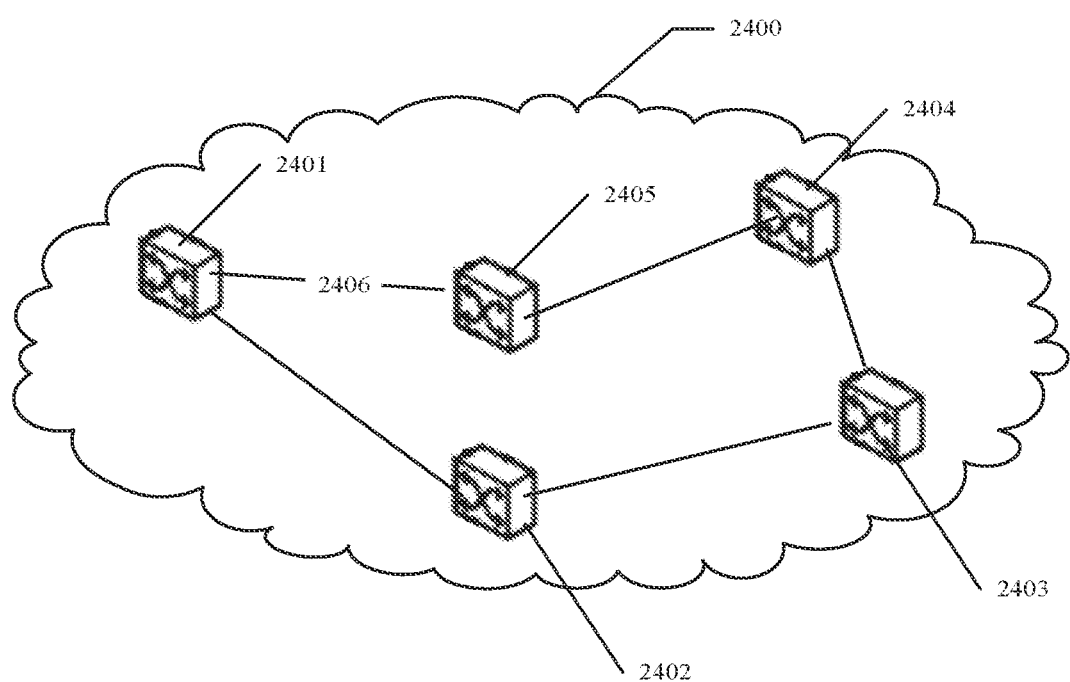
FIG. 24 is an example diagram of a structure of an optical communication system according to this application.

This application further provides an optical communication system. With reference to FIG. 24, the following describes a structure of an optical communication system 2400 provided in this application. The optical communication system 2400 includes a plurality of ROADMs, for example, a ROADM 2401, a ROADM 2402, a ROADM 2403, a ROADM 2404, and a ROADM 2405 that are shown in FIG. 24. It should be noted that the description of a quantity of ROADMs included in the optical communication system 2400 in this embodiment is an optional example, and no limitation is imposed.

The optical communication system 2400 further includes an optical fiber connected between two ROADMs. For example, for the ROADM 2401 and the ROADM 2405, the optical communication system 2400 further includes an optical fiber 2406 connected between the ROADM 2401 and the ROADM 2405. A connection relationship between the plurality of ROADMs included in the optical communication system 2400 is not limited in this embodiment. For specific descriptions of the ROADMs, refer to those shown in FIG. 2. Details are not described again.

The foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of embodiments of the present disclosure.

What is claimed is:

1. An optical switching apparatus comprising:
a dispersion component;
a first filter;
a redirection component comprising:
a first area; and
a second area, wherein the first area and the second area are separated from each other in a first direction, and wherein the first direction is a port direction of the redirection component;
input ports configured to enable a first beam and a second beam to be incident onto the dispersion component,
wherein the dispersion component is configured to:
decompose the first beam into a plurality of first sub-beams;
decompose the second beam into a plurality of second sub-beams, wherein the first sub-beams and the second sub-beams belong to different bands; and
transmit the first sub-beams and the second sub-beams;
a filter configured to:
receive the first sub-beams and the second sub-beams;
separate transmission directions of the first sub-beams and the second sub-beams into different transmission directions in the first direction based on the different bands;
enable the first sub-beams to be incident onto the first area; and
enable the second sub-beams to be incident onto the second area, and
wherein the redirection component is configured to:
perform redirection on the first sub-beams to obtain a plurality of redirected first sub-beams; and
perform redirection on the second sub-beams to obtain a plurality of redirected second sub-beams; and
an output port configured to output the redirected first sub-beams and the redirected second sub-beams.

2. The optical switching apparatus of claim 1, further comprising a second filter between the dispersion component and the input ports, wherein the dispersion component comprises:
a first grating configured to transmit the first sub-beams to the second filter; and
a second grating configured to transmit the second sub-beams to the second filter,
wherein the input ports are further configured to enable the first beam and the second beam to be incident onto the second filter,
wherein the second filter is configured to:
change the transmission directions based on bands to which the first beam and the second beam belong; and
transmit the first beam and the second beam to the first grating and the second grating at different locations,
wherein the second filter is further configured to transmit the first sub-beams and the second sub-beams to the redirection component based on the different bands, to enable the first area and the second area to be partially overlap in a second direction,
wherein the second direction is a wavelength direction of the redirection component, and
wherein the first direction is perpendicular to the second direction.

3. The optical switching apparatus of claim 2, wherein the second filter comprises:
a third area; and
a fourth area that partially overlaps the third area in the second direction,
wherein the first grating is configured to transmit at least one first sub-beam to the third area, and
wherein the second grating is configured to transmit at least one second sub-beam to the fourth area.

4. The optical switching apparatus of claim 1, wherein the input ports comprise:
a first input port configured to:
input the first beam; and
enable, in a second direction, the first beam to be incident onto the dispersion component at a first incident angle; and
a second input port configured to:
input the second beam; and enable, in the second direction, the second beam to be incident onto the dispersion component at a second incident angle, wherein locations of the first input port and the second input port are different in the second direction, wherein a first difference between a first absolute value of the first incident angle and a second absolute value of the second incident angle is not zero, wherein a second difference between the first incident angle and a first blaze angle is less than or equal to a first preset value, wherein the first blaze angle corresponds to a first band to which the first beam belongs, wherein a third difference between the second incident angle and a second blaze angle is less than or equal to a second preset value, and wherein the second blaze angle corresponds to a second band to which the second beam belongs.

5. The optical switching apparatus of claim 4, further comprising a lens component located between the input ports and the dispersion component, wherein the lens component is configured to transmit the first beam and the second beam to the dispersion component, wherein, in the second direction, a first value of a first distance between the first input port and an optical axis of the lens component is related to a second value of the first incident angle, and wherein, in the second direction, a third value of a second distance between the second input port and the optical axis is related to a fourth value of the second incident angle.

6. The optical switching apparatus of claim 5, further comprising:
a first reflector; and
a second reflector,
wherein the first filter is further configured to:
transmit the first sub-beams; and
transmit the second sub-beams,
wherein the first reflector is configured to:
receive the first sub-beams; and
transmit the first sub-beams to the redirection component, and
wherein the second reflector is configured to:
receive the second sub-beams; and
transmit the second sub-beams to the redirection component.

7. The optical switching apparatus of claim 6, wherein first filter comprises a fifth area and a sixth area, and wherein the redirection component is further configured to:
transmit the redirected first sub-beams to the first reflector; and
transmit the redirected second sub-beams to the second reflector,
wherein the first reflector is configured to transmit the redirected first sub-beams to the fifth area, and
wherein the second reflector is configured to transmit the redirected second sub-beams to the sixth area.

8. The optical switching apparatus of claim 7, wherein the first filter is further configured to:
transmit the redirected first sub-beams to the dispersion component;
transmit the redirected second sub-beams to the dispersion component, wherein the dispersion component is further configured to:
combine the redirected first sub-beams into a third beam; and
combine the redirected second sub-beams into a fourth beam, and wherein the output port is further configured to output the third beam and the fourth beam.

9. The optical switching apparatus of claim 8, wherein the first filter is further configured to:
reflect the first sub-beams from the first filter as a reflected light based on a third band to which the first sub-beams belong; and
enable the second sub-beams to pass through the first filter as a pass-through light based on a fourth band to which the second sub-beams belong.

10. The optical switching apparatus of claim 9, wherein the first filter is a thin film filter having two areas with different refractive indexes, wherein a fourth difference between first insertion losses caused when the two areas separately reflect one of the first sub-beams is less than or equal to a third preset value, and wherein a fourth difference between second insertion losses caused when one of the second sub-beams separately passes through the two areas is less than or equal to the third preset value.

11. The optical switching apparatus of claim 10, wherein the first beam comprises at least one different wavelength value than the second beam.

12. The optical switching apparatus of claim 11, wherein the first beam is a C band beam, and wherein the second beam is an L band beam.

13. An optical switching apparatus comprising:
a dispersion component;
a first filter;
a redirection component comprising:
a first area; and
a second area, wherein the first area and the second area are separated from each other in a first direction, and wherein the first direction is a port direction of the redirection component;
input ports configured to enable a first beam and a second beam to be incident onto the first filter, wherein the first beam and the second beam belong to different bands,
wherein the first filter is configured to:
separate transmission directions of the first beam and the second beam into different transmission directions in the first direction based on the different bands; and
transmit the first beam and the second beam to the dispersion component,
wherein the dispersion component is configured to:
decompose the first beam into a plurality of first sub-beams;
decompose the second beam into a plurality of second sub-beams; and
enable the first sub-beams and the second sub-beams to be incident onto the redirection component, wherein the first sub-beams are incident onto the first area, wherein the second sub-beams are incident onto the second area,
wherein the redirection component is configured to:
perform redirection on the first sub-beams to obtain a plurality of redirected first sub-beams; and
perform redirection on the second sub-beams to obtain a plurality of redirected second sub-beams;
an output port configured to output the redirected first sub-beams and the redirected second sub-beams;
a first reflector configured to:
receive the first sub-beams from the first filter; and
transmit the first sub-beams to the redirection component; and
a second reflector configured to:
receive the second sub-beams from the first filter; and transmit the second sub-beams to the redirection component.

14. The optical switching apparatus of claim 13, further comprising a second filter between the dispersion component and the first filter, wherein the dispersion component comprises:
  a first grating configured to transmit the first sub-beams to the second filter; and
  a second grating configured to transmit the second sub-beams to the second filter,
  wherein the first filter is further configured to enable the first beam and the second beam to be incident onto the second filter,
  wherein the second filter is configured to:
    change the transmission directions of the first beam and the second beam based on the different bands;
    transmit the first beam and the second beam to the first grating and the second grating at different locations;
    transmit the first sub-beams and the second sub-beams to the redirection component based on bands to which the first sub-beams and the second sub-beams belong to enable the first area and the second area to be partially overlap in a second direction,
  wherein the second direction is a wavelength direction of the redirection component, and
  wherein the first direction is perpendicular to the second direction.

15. The optical switching apparatus of claim 14, wherein the second filter comprises:
  a third area; and
  a fourth area that partially overlaps the third area in the second direction,
  wherein the first grating is further configured to transmit at least one first sub-beam to a to the third area, and
  wherein the second grating is further configured to transmit at least one second sub-beam to the fourth area.

16. The optical switching apparatus of claim 13, wherein the input ports comprise:
  a first input port configured to input the first beam; and
  a second input port configured to input the second beam,
  wherein locations of the first input port and the second input port are different in a second direction, and
  wherein the first filter is configured to:
    enable, in the second direction, the first beam to be incident onto the dispersion component at a first incident angle;
    enable, in the second direction, the second beam to be incident onto the dispersion component at a second incident angle,
    wherein a first difference between a first absolute value of the first incident angle and a second absolute value of the second incident angle is not zero,
    wherein a second difference between the first incident angle and a first blaze angle is less than or equal to a first preset value,
    wherein the first blaze angle corresponds to a first band to which the first beam belongs,
    wherein a third difference between the second incident angle and a second blaze angle is less than or equal to a second preset value, and
    wherein the second blaze angle corresponds to a second band to which the second beam belongs.

17. The optical switching apparatus of claim 16, further comprising a lens component located between the first filter and the dispersion component, wherein the lens component is configured to transmit the first beam and the second beam from the first filter to the dispersion component, wherein, in the second direction, a first value of a first distance between the first input port and an optical axis of the lens component is related to a second value of the first incident angle, and wherein, in the second direction, a third value of a second distance between the second input port and the optical axis is related to a fourth value of the second incident angle.

18. The optical switching apparatus of claim 17, wherein the first filter is further configured to:
  reflect the first beam from the first filter as a reflected light based on the first band; and
  enable the second beam to pass through the first filter as a pass-through light based on the second band.

19. The optical switching apparatus of claim 18, wherein the first filter is a thin film filter having two areas with different refractive indexes, wherein a fourth difference between first insertion losses caused when the two areas separately reflect the first beam is less than or equal to a third preset value, and wherein a fifth difference between second insertion losses caused when the second beam separately passes through the two areas is less than or equal to the third preset value.

20. A redirection method implemented by an optical switching apparatus, wherein the redirection method comprises:
  enabling, using input ports of the optical switching apparatus, a first beam and a second beam to be incident onto a dispersion component of the optical switching apparatus;
  decomposing, using the dispersion component, the first beam into a first sub-beams;
  decomposing, using the dispersion component, the second beam into a second sub-beams;
  transmitting, using the dispersion component, the first sub-beams and the second sub-beams to a filter of the optical switching apparatus, wherein the first sub-beams and the second sub-beams belong to different bands;
  separating, using the filter, transmission directions of the first sub-beams and the second sub-beams into different transmission directions in a first direction based on the different bands;
  enabling, using the filter, the first sub-beams to be incident onto a first area of a redirection component of the optical switching apparatus;
  enabling, using the filter, the second sub-beams to be incident onto a second area of the redirection component, wherein the first area and the second area are separated from each other in the first direction, and wherein the first direction is a port direction of the redirection component;
  performing, using the redirection component, redirection on the first sub-beams to obtain a plurality of redirected first sub-beams;
  performing, using the redirection component, redirection on the second sub-beams to obtain a plurality of redirected second sub-beams; and
  outputting, using an output port of the optical switching apparatus, the redirected first sub-beams and the redirected second sub-beams.

\* \* \* \* \*

UNITED STATES PATENT AND TRADEMARK OFFICE
CERTIFICATE OF CORRECTION

PATENT NO. : 12,068,842 B2
APPLICATION NO. : 17/994605
DATED : August 20, 2024
INVENTOR(S) : Wei Jia and Han Zhao It is certified that error appears in the above-identified patent and that said Letters Patent is hereby corrected as shown below:

In the Claims

Claim 14, Column 45, Line 18: "different locations;" should read "different locations; and"

Signed and Sealed this
Twenty-fourth Day of September, 2024

Katherine Kelly Vidal
*Director of the United States Patent and Trademark Office*